(12) United States Patent
Bernatchez et al.

(10) Patent No.: US 12,479,313 B2
(45) Date of Patent: Nov. 25, 2025

(54) RUNAWAY PREVENTION SYSTEMS AND METHODS FOR ELECTRIC VEHICLES

(71) Applicant: TAIGA MOTORS INC., Lasalle (CA)

(72) Inventors: Gabriel Bernatchez, Montreal (CA); Amin Zabihinejad, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 220 days.

(21) Appl. No.: 17/730,332

(22) Filed: Apr. 27, 2022

(65) Prior Publication Data

US 2022/0355676 A1 Nov. 10, 2022

Related U.S. Application Data

(60) Provisional application No. 63/183,887, filed on May 4, 2021.

(51) Int. Cl.
*B60L 15/20* (2006.01)
*B60K 28/00* (2006.01)
(Continued)

(52) U.S. Cl.
CPC ......... *B60L 15/2009* (2013.01); *B60W 20/20* (2013.01); *B60W 20/40* (2013.01);
(Continued)

(58) Field of Classification Search
CPC ............ B60L 15/2009; B60L 2200/00; B60L 2240/421; B60L 2240/423; B60L 2200/22;
(Continued)

(56) References Cited

U.S. PATENT DOCUMENTS 5,642,023 A * 6/1997 Journey ................. B60L 50/52
318/493
5,644,202 A * 7/1997 Toriyama ............... B60L 50/52
318/369

(Continued)

FOREIGN PATENT DOCUMENTS

EP 1410942 B1 4/2004
EP 2778032 B1 9/2014

(Continued)

OTHER PUBLICATIONS

EPO machine translated description of reference JP-2002095279-A. (Year: 2002).*

(Continued)

*Primary Examiner* — Navid Z. Mehdizadeh
*Assistant Examiner* — Shelley Marie Osterhout
(74) *Attorney, Agent, or Firm* — Norton Rose Fulbright Canda LLP

(57) ABSTRACT

Systems and methods of stopping propulsion of an electric vehicle in an emergency situation are provided. One method includes receiving a command to stop propulsion of the electric vehicle while the electric vehicle is in motion, and in response to the command, attempting to regulate an operation of an electric motor of the electric vehicle toward a no-load operating state of the electric motor while the electric vehicle is in motion. When the operation of the electric motor is outside a prescribed range of the no-load operating state after attempting to regulate the operation of the electric motor toward the no-load operating state, the method includes causing braking of the electric motor.

20 Claims, 14 Drawing Sheets

(51) Int. Cl.
*B60W 20/20* (2016.01)
*B60W 20/40* (2016.01)
*H02P 3/22* (2006.01)

(52) U.S. Cl.
CPC .............. *H02P 3/22* (2013.01); *B60K 28/00* (2013.01); *B60L 2200/00* (2013.01); *B60L 2240/421* (2013.01); *B60L 2240/423* (2013.01); *B60W 2300/36* (2013.01)

(58) Field of Classification Search
CPC .... B60L 3/02; B60L 7/003; H02P 3/22; H02P 23/14; H02P 25/022; B60K 28/00; B60K 28/04; B60W 20/20; B60W 20/40; B60W 2300/36; B60W 2300/44
See application file for complete search history.

(56) References Cited

U.S. PATENT DOCUMENTS

| | | | |
|---|---|---|---|
| 6,108,179 | A | 8/2000 | Katae et al. |
| 6,750,411 | B2 | 6/2004 | Janisch |
| 7,117,968 | B2 | 10/2006 | Ono et al. |
| 7,414,519 | B2 | 8/2008 | Onishi et al. |
| 9,656,551 | B2 | 5/2017 | Matsuda |
| 2004/0069549 | A1 | 4/2004 | Ono et al. |
| 2013/0002184 | A1* | 1/2013 | Bates ........................ H02P 1/04 |
| | | | 318/495 |
| 2013/0229136 | A1* | 9/2013 | Bates ........................ H02P 1/04 |
| | | | 318/400.41 |
| 2016/0303996 | A1* | 10/2016 | Sponheimer ........ B60L 15/2045 |
| 2017/0361814 | A1* | 12/2017 | Natoli ........................ B60T 7/14 |
| 2019/0241075 | A1* | 8/2019 | Kurosawa ............... B60L 15/10 |
| 2019/0319472 | A1 | 10/2019 | Lebreux |
| 2020/0140037 | A1 | 5/2020 | Haavikko et al. |
| 2022/0009589 | A1 | 1/2022 | Matsushita |
| 2022/0017181 | A1 | 1/2022 | Suzuki et al. |
| 2022/0063764 | A1 | 3/2022 | Matsushita |
| 2022/0111929 | A1 | 4/2022 | Matsushita |
| 2022/0411018 | A1* | 12/2022 | Vaisanen ............. B60L 15/2009 |

FOREIGN PATENT DOCUMENTS

| | | | |
|---|---|---|---|
| JP | 2002095279 | A * | 3/2002 |
| JP | 2015023611 | A * | 2/2015 |
| WO | 2021084520 | A2 | 5/2021 |

OTHER PUBLICATIONS

EPO machine translated description of reference JP-2015023611-A (Year: 2015).*
Snowmobile Safety and Certification Committee, Inc., SSCC/11 Supplement—Detailed Standards and Testing Specifications and Procedures, Jun. 10, 2020, Haslett, USA.
SAE International, Surface Vehicle Recommended Practice J1222—Speed Control Assurance for Snowmobiles, Aug. 2014, http://www.sae.org.

* cited by examiner

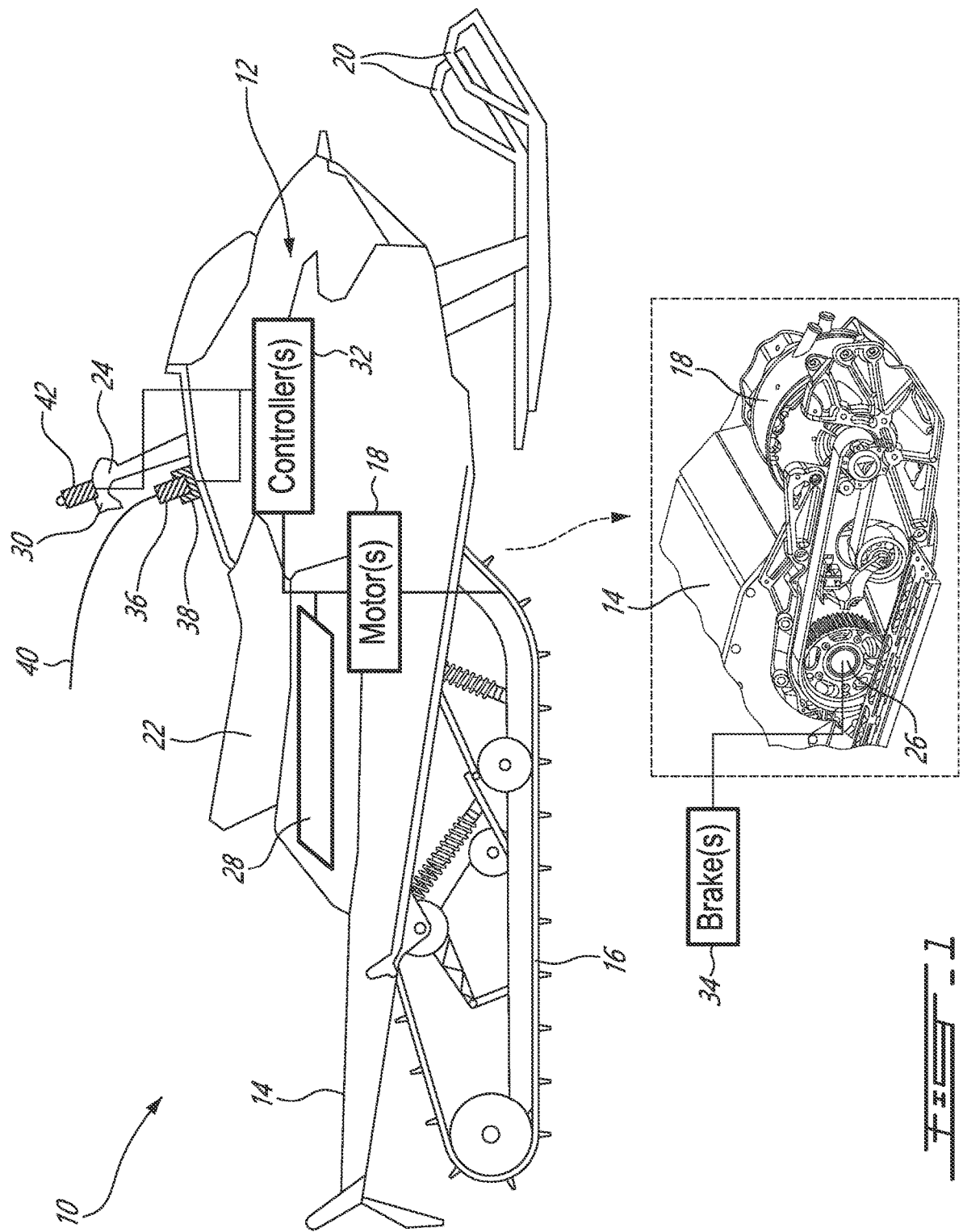

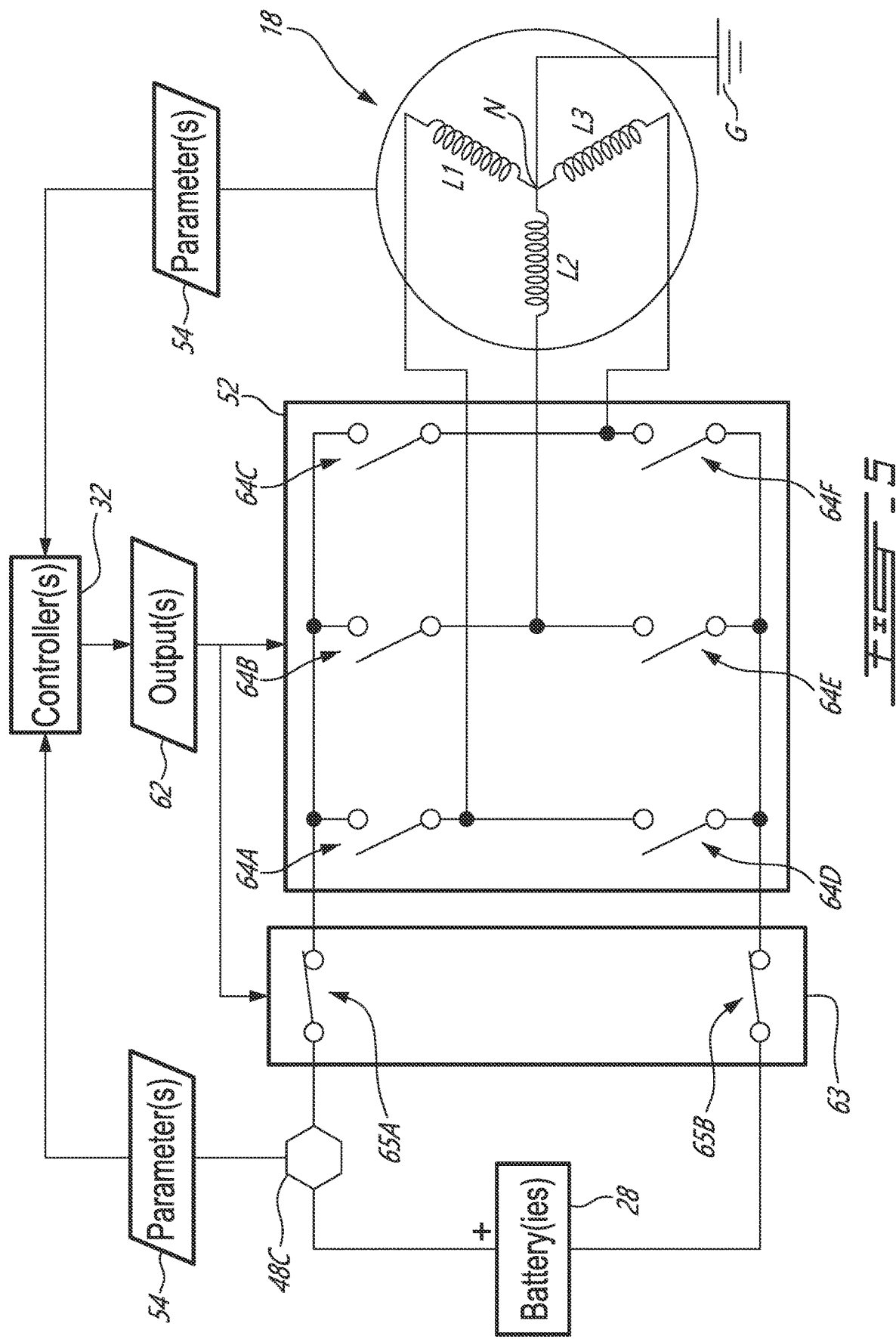

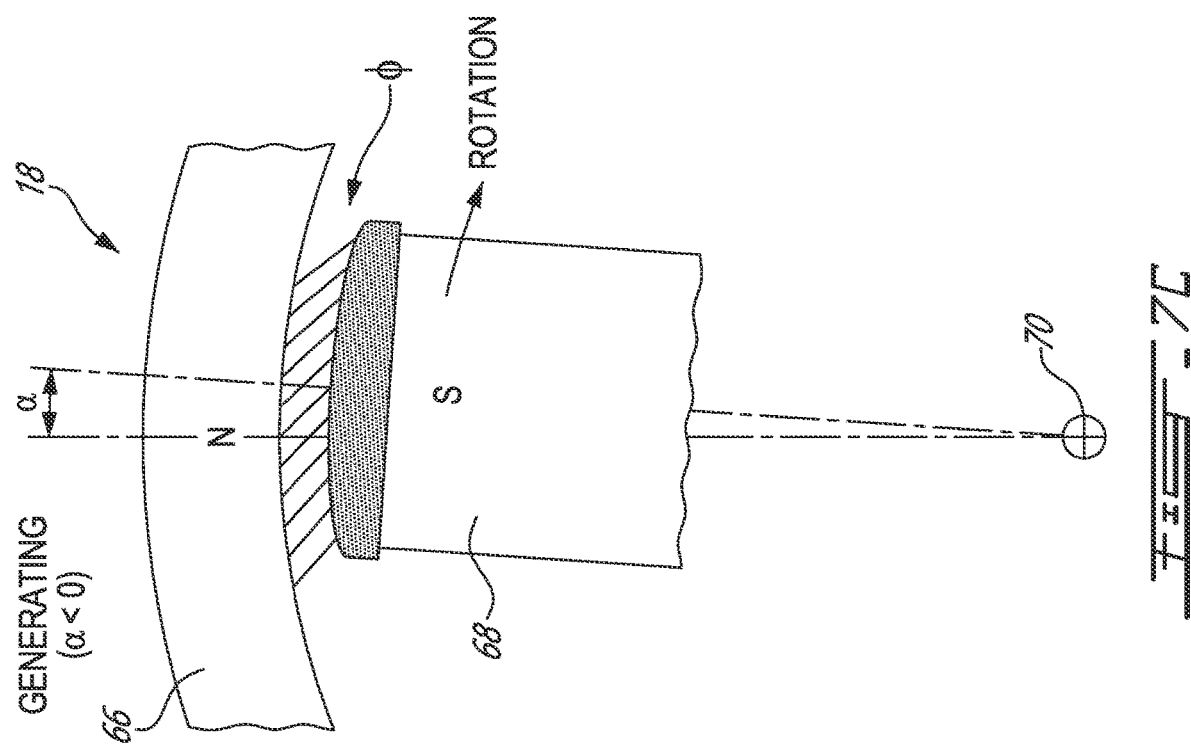

| Motor Drive Current | Motor Output Torque |
|---|---|
| C1 | T1 |
| C2 | T2 |
| C3 | T3 |

FIG - 9

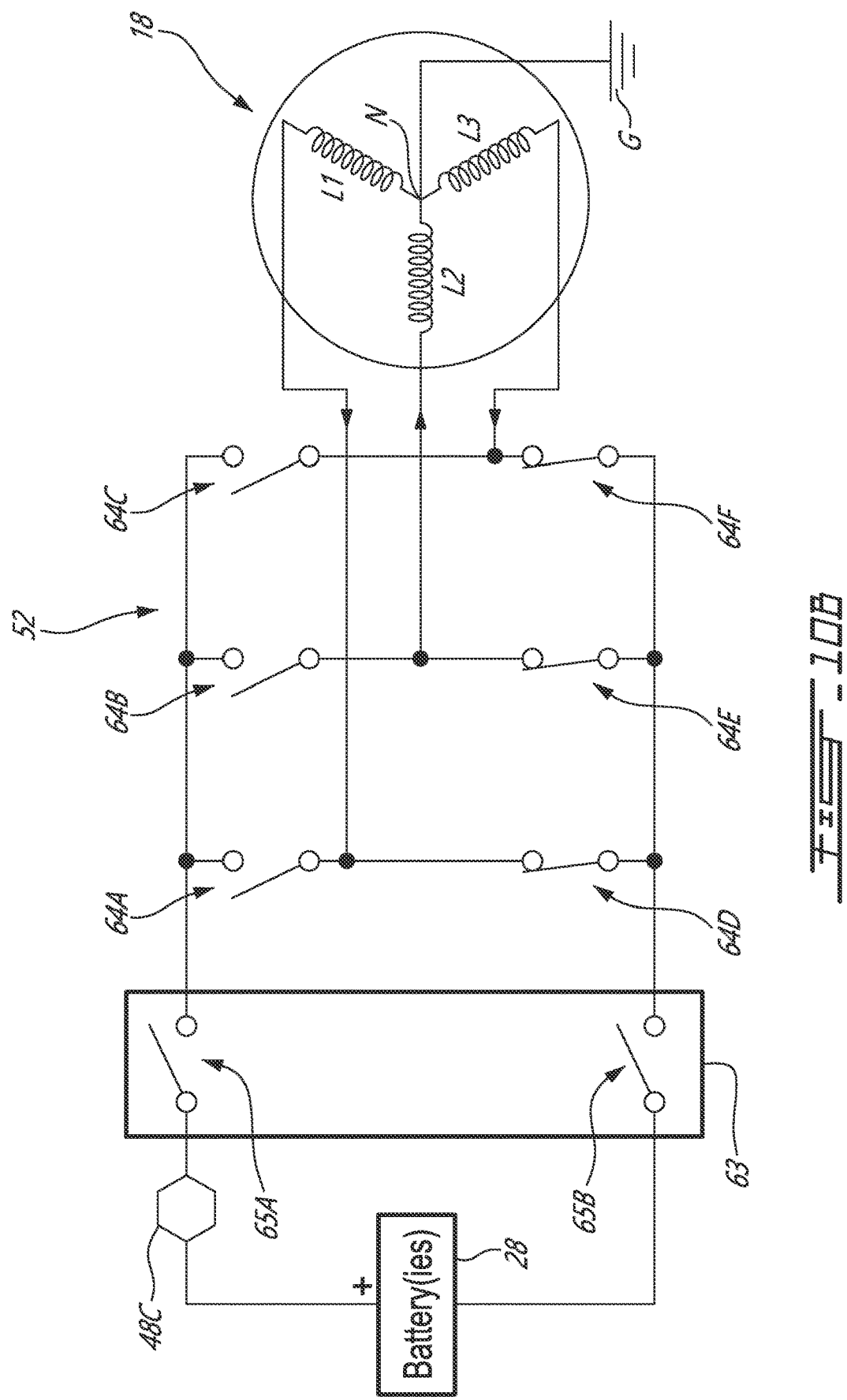

RUNAWAY PREVENTION SYSTEMS AND METHODS FOR ELECTRIC VEHICLES

CROSS-REFERENCE TO RELATED APPLICATION(S)

This application claims priority from U.S. Provisional Patent Application No. 63/183,887, filed May 4, 2021, which is incorporated by reference in its entirety herein.

TECHNICAL FIELD

The disclosure relates generally to electric vehicles, and more particularly to stopping propulsion of electric vehicles.

BACKGROUND

Powersport vehicles typically have an emergency shutoff system designed to provide an instantaneous interruption of the ignition system of the engine in case of an emergency. Such emergency shutoff systems can be activated via an emergency shutoff switch that is readily accessible by the operator when the operator is in the normal driving position. While existing emergency shutoff systems are suitable for vehicles that are propelled by internal combustion engines, they are typically not suitable for electric powersport vehicles.

SUMMARY

In one aspect, the disclosure describes a method of stopping propulsion of an electric vehicle. The method comprises:
  while the electric vehicle is in motion, receiving a command to stop propulsion of the electric vehicle;
  in response to the command, initiating a regulation of an operation of an electric motor configured to propel the electric vehicle toward a no-load operating state of the electric motor while the electric vehicle is in motion; and
  when the operation of the electric motor is outside a prescribed range of the no-load operating state after a prescribed amount of time after initiating the regulation of the operation of the electric motor toward the no-load operating state:
  preventing electric power from being supplied to armature windings of the electric motor; and
  causing two or more of the armature windings to adopt a short-circuit state.

The method may comprise determining that the operation of the electric motor is outside the prescribed range of the no-load operating state when an output torque of the electric motor is equal to or greater than a torque threshold.

The torque threshold may be equal to or less than 5% of a maximum output torque rating of the electric motor.

The method may comprise determining that the operation of the electric motor is outside the prescribed range of the no-load operating state when an input current to the electric motor is equal to or greater than a current threshold.

The electric motor may be a synchronous motor. The electric power may be supplied to the electric motor from a battery via an inverter. The two or more armature windings of the electric motor may be caused to adopt the short-circuit state using the inverter.

The method may comprise, when the operation of the electric motor is outside the prescribed range of the no-load operating state after the prescribed amount of time, causing all armature windings of the electric motor to adopt the short-circuit state.

The prescribed amount of time may be less than one second.

Initiating the regulation of the operation of the electric motor toward the no-load operating state of the electric motor may include causing an operating speed of the electric motor to substantially match an induced operating speed of the electric motor induced by the motion of the electric vehicle.

The method may comprise continuing to cause the operating speed of the electric motor to substantially match the induced operating speed of the electric motor as a speed of the electric vehicle is decreasing.

The method may comprise:
  when the operation of the electric motor is inside the prescribed range of the no-load operating state, monitoring the operation of the electric motor while the electric vehicle is in motion; and
  when the operation of the electric motor goes from inside the prescribed range of the no-load operating state to outside the prescribed range of the no-load operating state while the electric vehicle is in motion:
  preventing electric power from being supplied to the two or more armature windings of the electric motor; and
  causing the two or more armature windings of the electric motor to adopt the short-circuit state.

The method may comprise receiving the command from an emergency shutoff switch of the electric vehicle or from a tether switch of the electric vehicle.

Embodiments may include combinations of the above features.

In another aspect, the disclosure describes a computer program product for stopping propulsion of an electric vehicle, the computer program product comprising a non-transitory computer readable storage medium having program code embodied therewith, the program code readable/executable by a computer, processor or logic circuit to perform a method as described herein.

In another aspect, the disclosure describes a method of stopping propulsion of an electric powersport vehicle in an emergency situation. The method comprises:
  causing an electric motor of the electric powersport vehicle to propel the electric powersport vehicle;
  receiving, via an emergency shutoff switch of the electric powersport vehicle or via a tether switch of the electric powersport vehicle, a command to stop propulsion of the electric powersport vehicle while the electric powersport vehicle is in motion;
  in response to the command, attempting to regulate an operation of the electric motor toward a no-load operating state of the electric motor while the electric powersport vehicle is in motion; and
  when the operation of the electric motor is outside a prescribed range of the no-load operating state after attempting to regulate the operation of the electric motor toward the no-load operating state, causing braking of the electric motor.

Causing braking of the electric motor may include:
  preventing electric power from being supplied to armature windings of the electric motor; and
  causing two or more of the armature windings to adopt a short-circuit state.

Causing two or more of the armature windings to adopt the short-circuit state may include causing all armature windings of the electric motor to adopt the short-circuit state.

The method may comprise determining that the operation of the electric motor is outside the prescribed range of the no-load operating state when an output torque of the electric motor is equal to or greater than a torque threshold.

The method may comprise determining that the operation of the electric motor is outside the prescribed range of the no-load operating state when an input current to the electric motor is equal to or greater than a current threshold.

Attempting to regulate the operation of the electric motor toward the no-load operating state of the electric motor may include attempting to cause an operating speed of the electric motor to substantially match an induced operating speed of the electric motor induced by the motion of the electric powersport vehicle.

The method may comprise continuing to cause the operating speed of the electric motor to substantially match the induced operating speed of the electric motor as the electric powersport vehicle is coasting.

The method may comprise:
 when the operation of the electric motor is inside the prescribed range of the no-load operating state, monitoring the operation of the electric motor while the electric powersport vehicle is in motion; and
 when the operation of the electric motor goes from inside the prescribed range of the no-load operating state to outside the prescribed range of the no-load operating state while the electric powersport vehicle is in motion, causing braking of the electric motor.

Causing braking of the electric motor may be performed after a prescribed amount of time of attempting to regulate the operation of the electric motor toward the no-load operating state.

The prescribed amount of time may be less than one second.

Embodiments may include combinations of the above features.

In another aspect, the disclosure describes a computer program product for stopping propulsion of an electric powersport vehicle, the computer program product comprising a non-transitory computer readable storage medium having program code embodied therewith, the program code readable/executable by a computer, processor or logic circuit to perform a method as described herein.

In another aspect, the disclosure describes a vehicle runaway prevention system for an electric vehicle. The vehicle runaway prevention system comprises:
 one or more sensors operatively connected to sense one or more parameters indicative of an operation of an electric motor configured to propel the electric vehicle;
 one or more data processors operatively connected to the one or more sensors; and
 non-transitory machine-readable memory storing instructions executable by the one or more data processors and configured to cause the one or more data processors to:
 cause electric power to be supplied to the electric motor of the electric vehicle to propel the electric vehicle;
 in response to receiving a command initiated due to an emergency situation while the electric vehicle is in motion, attempt, using the one or more parameters, to regulate the operation of the electric motor toward a no-load operating state of the electric motor while the electric vehicle is in motion; and
 when the operation of the electric motor is outside a prescribed range of the no-load operating state after attempting to regulate the operation of the electric motor toward the no-load operating state, cause braking of the electric motor.

The instructions may be configured to cause the one or more data processors to determine that the operation of the electric motor is outside the prescribed range of the no-load operating state when an output torque of the electric motor is equal to or greater than a torque threshold.

The instructions may be configured to cause the one or more data processors to determine that the operation of the electric motor is outside the prescribed range of the no-load operating state when an input current to the electric motor is equal to or greater than a current threshold.

The instructions may be configured to cause the one or more data processors to cause braking of the electric motor after a prescribed amount of time of attempting to regulate the operation of the electric motor toward the no-load operating state. The prescribed amount of time may be less than one second.

The instructions may be configured to cause the one or more data processors to attempt to regulate the operation of the electric motor toward the no-load operating state of the electric motor by attempting to cause an operating speed of the electric motor to substantially match an induced operating speed of the electric motor induced by the motion of the electric vehicle.

The instructions may be configured to cause the one or more data processors to attempt to cause the operating speed of the electric motor to substantially match the induced operating speed of the electric motor as the electric vehicle is coasting.

The instructions may be configured to cause the one or more data processors to:
 when the operation of the electric motor is inside the prescribed range of the no-load operating state, monitor the operation of the electric motor while the electric vehicle is in motion; and
 when the operation of the electric motor goes from inside the prescribed range of the no-load operating state to outside of the prescribed range of the no-load operating state while the electric vehicle is in motion, cause braking of the electric motor.

The vehicle runaway prevention system may comprise an emergency shutoff switch to initiate the command.

The vehicle runaway prevention system may comprise a tether switch to initiate the command.

Causing braking of the electric motor may include:
 preventing electric power from being supplied to armature windings of the electric motor; and
 causing two or more of the armature windings to adopt a short-circuit state.

Embodiments may include combinations of the above features.

In another aspect, the disclosure describes an electric powersport vehicle comprising a vehicle runaway prevention system as described herein.

In another aspect, the disclosure describes an electric powersport vehicle with vehicle runaway prevention. The electric powersport vehicle comprises:
 an electric motor for propelling the electric powersport vehicle;
 one or more sensors operatively connected to sense one or more parameters indicative of an operation of the electric motor;

a switch to initiate a command during an emergency situation while the electric powersport vehicle is in motion;

a controller operatively connected to the electric motor, to the switch and to the one or more sensors, the controller being configured to:

in response to the command, attempt to regulate, while the electric powersport vehicle is in motion, the operation of the electric motor toward a no-load operating state of the electric motor; and when the operation of the electric motor is outside a prescribed range of the no-load operating state after attempting to regulate the operation of the electric motor toward the no-load operating state, cause braking of the electric motor.

Causing braking of the electric motor may include:
preventing electric power from being supplied to armature windings of the electric motor; and
causing two or more armature windings of the electric motor to adopt a short-circuit state.

The controller may be configured to determine that the operation of the electric motor is outside the prescribed range of the no-load operating state when an output torque of the electric motor is equal to or greater than a torque threshold.

The controller may be configured to determine that the operation of the electric motor is outside the prescribed range of the no-load operating state when an input current to the electric motor is equal to or greater than a current threshold.

The controller may be configured to cause braking of the electric motor after a prescribed amount of time of attempting to regulate the operation of the electric motor toward the no-load operating state. The prescribed amount of time may be less than one second.

Attempting to regulate the operation of the electric motor toward the no-load operating state of the electric motor may include attempting to cause an operating speed of the electric motor to substantially match an induced operating speed of the electric motor induced by the motion of the electric powersport vehicle.

The controller may be configured to:
when the operation of the electric motor is inside the prescribed range of the no-load operating state, monitoring the operation of the electric motor while the electric powersport vehicle is in motion; and
when the operation of the electric motor goes from inside the prescribed range of the no-load operating state to outside of the prescribed range of the no-load operating state while the electric powersport vehicle is in motion:
cause the supply of electric power to the electric motor to be prevented; and
cause braking of the electric motor.

The electric powersport vehicle may be a snowmobile.

Embodiments may include combinations of the above features.

In another aspect, the disclosure describes a computer program product for implementing a vehicle runaway prevention function with an electric vehicle, the computer program product comprising a non-transitory computer readable storage medium having program code embodied therewith, the program code readable/executable by a computer, processor or logic circuit to perform a method comprising:

in response to receiving a command initiated due to an emergency situation, attempting to regulate, while the electric vehicle is in motion, the operation of the electric motor toward a no-load operating state of the electric motor; and when the operation of the electric motor is outside a prescribed range of the no-load operating state after attempting to regulate of the operation of the electric motor toward the no-load operating state, causing braking of the electric motor.

Causing braking of the electric motor may include:
preventing electric power from being supplied to armature windings of the electric motor; and
causing two or more armature windings of the electric motor to adopt a short-circuit state.

In another aspect, the disclosure describes a method of preventing vehicle runaway of an electric powersport vehicle in an emergency situation. The method comprises:

receiving, via an emergency shutoff switch of the electric powersport vehicle or via a tether switch of the electric powersport vehicle, a signal indicating an existence of the emergency situation while the electric powersport vehicle is in motion; and in response to the signal, attempting to regulate an operation of an electric motor configured to propel the electric powersport vehicle to cause regenerative braking of the electric motor while the electric powersport vehicle is in motion.

The signal may be received via the tether switch.

The signal may be received via the emergency shutoff switch.

The method may comprise, after a prescribed amount of time of attempting to regulate the operation of the electric motor to cause regenerative braking of the electric motor, causing two or more armature windings of the electric motor to adopt a short-circuit state.

The prescribed amount of time may be less than one second.

Embodiments may include combinations of the above features.

In another aspect, the disclosure describes a computer program product for preventing vehicle runaway of an electric powersport vehicle in an emergency situation, the computer program product comprising a non-transitory computer readable storage medium having program code embodied therewith, the program code readable/executable by a computer, processor or logic circuit to perform a method as described herein.

In another aspect, the disclosure describes a method of preventing vehicle runaway of an electric powersport vehicle. The method comprises:

receiving a signal indicating a separation of an operator of the electric powersport vehicle from the electric powersport vehicle while the electric powersport vehicle is in motion; and in response to the signal, regulating an operation of an electric motor configured to propel the electric powersport vehicle to cause regenerative braking of the electric motor while the electric powersport vehicle is in motion.

The method may comprise, after a prescribed amount of time of regulating the operation of the electric motor to cause regenerative braking of the electric motor, and the operation of the electric motor being outside a predefined operating range, causing two or more armature windings of the electric motor to adopt a short-circuit state.

Embodiments may include combinations of the above features.

In a further aspect, the disclosure describes an electric powersport vehicle with vehicle runaway prevention. The electric powersport vehicle comprises:
- an electric motor for propelling the electric powersport vehicle;
- a tether switch to signal a separation of an operator of the electric powersport vehicle from the electric powersport vehicle;
- a controller operatively connected to the electric motor and to the tether switch, the controller being configured to:
- in response to the separation of the operator from the electric powersport vehicle being signaled while the electric powersport vehicle is in motion, regulate an operation of the electric motor to cause regenerative braking of the electric motor while the electric powersport vehicle is in motion.

The controller may be configured to, after a prescribed amount of time of regulating the operation of the electric motor to cause regenerative braking of the electric motor, and the operation of the electric motor being outside a predefined operating range, cause two or more armature windings of the electric motor to adopt a short-circuit state.

The prescribed amount of time may be less than one second.

Embodiments may include combinations of the above features.

In a further aspect, the disclosure describes a method of stopping propulsion of a electric powersport vehicle in motion. The method comprises:
- while the electric powersport vehicle is in motion, receiving a command to stop propulsion of the electric powersport vehicle;
- in response to the command, initiating a regulation of an operation of an electric motor configured to propel the electric powersport vehicle toward a no-load operating state of the electric motor while the electric powersport vehicle is in motion; and
- when the operation of the electric motor is outside a prescribed range of the no-load operating state after a prescribed amount of time after initiating the regulation of the operation of the electric motor toward the no-load operating state, preventing electric power from being supplied to armature windings of the electric motor while the electric powersport vehicle is in motion.

Preventing electric power from being supplied to the armature windings of the electric motor may include electrically disconnecting a battery configured to supply electric power to the armature windings from an inverter operatively disposed between the battery and the armature windings.

The method may comprise, when the operation of the electric motor is outside the prescribed range of the no-load operating state after the prescribed amount of time, causing two or more of the armature windings to adopt a short-circuit state.

The method may comprise, when the operation of the electric motor is outside the prescribed range of the no-load operating state after the prescribed amount of time, causing the armature windings of the electric motor to adopt an open-circuit state.

The method may comprise determining that the operation of the electric motor is outside the prescribed range of the no-load operating state when an output torque of the electric motor is equal to or greater than a torque threshold.

The method may comprise determining that the operation of the electric motor is outside the prescribed range of the no-load operating state when an input current to the electric motor is equal to or greater than a current threshold.

The prescribed amount of time may be less than one second.

Initiating the regulation of the operation of the electric motor toward the no-load operating state of the electric motor may include causing an operating speed of the electric motor to substantially match an induced operating speed of the electric motor induced by the motion of the electric vehicle.

The method may comprise receiving the command from an emergency shutoff switch or from a tether switch of the electric powersport vehicle.

The electric powersport vehicle may be a snowmobile.

Embodiments may include combinations of the above features.

In a further aspect, the disclosure describes a vehicle runaway prevention system for an electric vehicle. The vehicle runaway prevention system comprises:
- one or more sensors operatively connected to sense one or more parameters indicative of an operation of an electric motor configured to propel the electric vehicle;
- one or more data processors operatively connected to the one or more sensors; and
- non-transitory machine-readable memory storing instructions executable by the one or more data processors and configured to cause the one or more data processors to:
- cause electric power to be supplied to the electric motor of the electric vehicle to propel the electric vehicle;
- in response to receiving a command initiated due to an emergency situation while the electric vehicle is in motion, attempt, using the one or more parameters, to regulate the operation of the electric motor toward a no-load operating state of the electric motor while the electric vehicle is in motion; and
- when the operation of the electric motor is outside a prescribed range of the no-load operating state after attempting to regulate the operation of the electric motor toward the no-load operating state, prevent electric power from being supplied to armature windings of the electric motor while the electric vehicle is in motion.

Preventing electric power from being supplied to the armature windings of the electric motor may include causing a battery configured to supply electric power to the armature windings to be electrically disconnected from an inverter operatively disposed between the battery and the armature windings.

The instructions may be configured to cause the one or more data processors to, when the operation of the electric motor is outside the prescribed range of the no-load operating state after attempting to regulate the operation of the electric motor toward the no-load operating state, cause two or more of the armature windings to adopt a short-circuit state.

The instructions may be configured to cause the one or more data processors to, when the operation of the electric motor is outside the prescribed range of the no-load operating state after attempting to regulate the operation of the electric motor toward the no-load operating state, cause the armature windings of the electric motor to adopt an open-circuit state.

The instructions may be configured to cause the one or more data processors to determine that the operation of the electric motor is outside the prescribed range of the no-load operating state when an output torque of the electric motor is equal to or greater than a torque threshold.

The instructions may be configured to cause the one or more data processors to determine that the operation of the electric motor is outside the prescribed range of the no-load operating state when an input current to the electric motor is equal to or greater than a current threshold.

The prescribed amount of time may be less than one second.

The vehicle runaway prevention system may comprise an emergency shutoff switch to initiate the command. The vehicle runaway prevention system may comprise a tether switch to initiate the command.

Further details of these and other aspects of the subject matter of this application will be apparent from the detailed description included below and the drawings.

DESCRIPTION OF THE DRAWINGS

Reference is now made to the accompanying drawings, in which:

FIG. 1 is a schematic representation of an exemplary electric vehicle including a vehicle runaway prevention system as described herein;

FIG. 6 shows a flow diagram of an exemplary method of stopping propulsion of an electric vehicle;

FIGS. 7A-7C are schematic representations of part of the electric motor in a no-load operating state, in a motoring operating state, and in a generating operating state respectively;

FIG. 9 shows a table illustrating a relationship between an electric current supplied to the electric motor of the electric vehicle, and the output torque of the electric motor;

FIG. 10B is a schematic representation of the power inverter of FIG. 5 in a second configuration causing braking of the electric motor;

DETAILED DESCRIPTION

Figure 3:
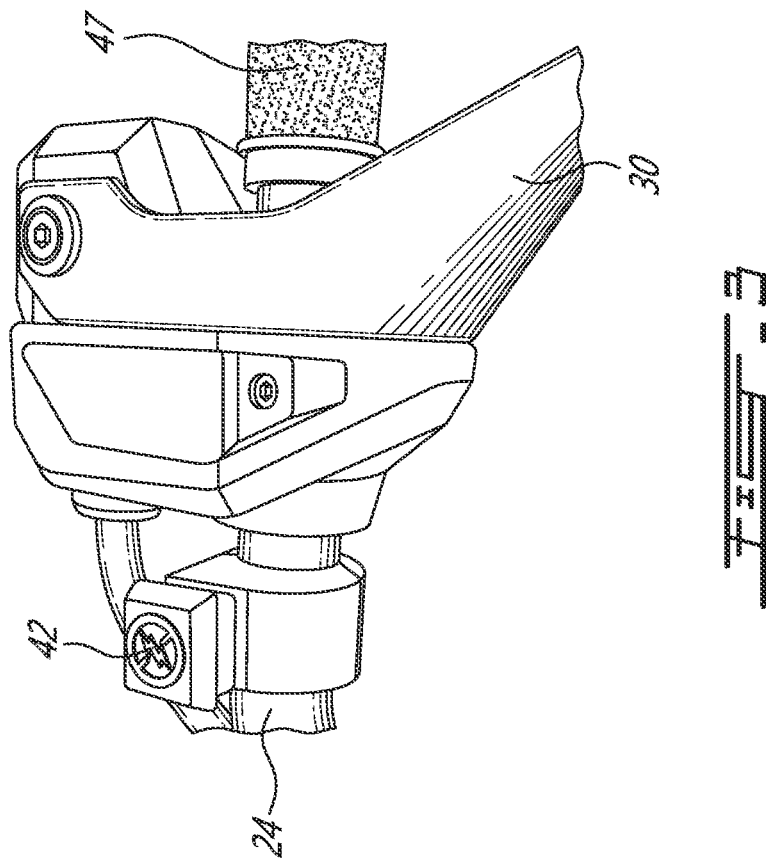
FIG. 3 shows an exemplary emergency shutoff switch associated with the electric vehicle of FIG. 1.

The following disclosure relates to systems and associated methods for stopping propulsion of electric vehicles, preventing vehicle runaway and/or preventing undesirable vehicle operation (e.g., motion) in some situations. In some embodiments, the systems and methods described herein may be particularly suitable for electric powersport vehicles. Examples of suitable electric powersport vehicles include snowmobiles, motorcycles, personal watercraft (PWCs), all-terrain vehicles (ATVs), and (e.g., side-by-side) utility task vehicles (UTVs). In some embodiments, the systems and methods described herein may cause an electric motor propelling the vehicle to be regulated to adopt a no-load or regenerative braking operating state to prevent vehicle runaway in an emergency situation for example. In case of the no-load or regenerative braking operating state of the electric motor not being reached within an acceptable time duration, an escalation protocol may cause a fail-safe backup mechanism preventing vehicle runaway to be activated if necessary. In some embodiments, the backup mechanism may include causing braking of the electric motor. The backup mechanism may promote a relatively reliable and robust vehicle runaway prevention capability for the vehicle and also promote operator safety.

The terms "connected" and "coupled to" may include both direct connection and coupling (where two elements contact each other) and indirect connection and coupling (where at least one additional element is located between the two elements).

The term "substantially" as used herein may be applied to modify any quantitative representation which could permissibly vary without resulting in a change in the basic function to which it is related. For example, the term "substantially" is used herein in relation to operating conditions of an electric motor. It is understood that such operating conditions (e.g., no-load and zero torque) described herein may permissibly encompass (e.g., negligible) variations that still permit the associated objective(s) to be achieved.

Aspects of various embodiments are described through reference to the drawings.

FIG. 1 is a schematic representation of an exemplary electric powersport vehicle 10 (referred hereinafter as "vehicle 10") including runaway prevention system 12 (referred hereinafter as "system 12") as described herein. As illustrated in FIG. 1, vehicle 10 may be a snowmobile but it is understood that the systems described herein may also be used on other types of electric vehicles such as electric UTVs, electric ATVs, electric PWCs, electric motorcycles, and other electric powersport vehicles. In some embodiments, vehicle 10 may be an electric snowmobile including elements of the snow vehicle described in International Patent Application no. WO 2019/049109 A1 (Title: Battery arrangement for electric snow vehicles), and U.S. Patent Application No. 63/135,497 (Title: Electric vehicle with battery pack as structural element) which are incorporated herein by reference.

Vehicle 10 may include a frame (also known as a chassis) which may include tunnel 14, track 16 having the form of an endless belt for engaging the ground and disposed under tunnel 14, one or more electric motors 18 (referred hereinafter in the singular) mounted to the frame and configured to drive track 16, left and right skis 20 disposed in a front portion of vehicle 10, straddle seat 22 disposed above tunnel 14 for accommodating an operator of vehicle 10 and optionally one or more passengers (not shown). Skis 20 may be movably attached to the frame to permit steering of vehicle 10 via a steering assembly including a steering column interconnecting handlebar 24 with skis 20.

Motor 18 may be drivingly coupled to track 16 via drive shaft 26 shown in the inset of FIG. 1. Electric motor 18 may be in torque-transmitting engagement with drive shaft 26 via a belt/pulley drive. However, motor 18 may be in torque-transmitting engagement with drive shaft 26 via other arrangements such as a chain/sprocket drive, or shaft/gear drive for example. Drive shaft 26 may be drivingly coupled to track 16 via one or more toothed wheels or other means so as to transfer motive power from motor 18 to track 16.

Vehicle 10 may also include one or more batteries 28 (referred hereinafter in the singular) for providing electric power to motor 18 and driving motor 18. Battery 28 may be disposed under seat 22. The operation of motor 18 and the delivery of electric power to motor 18 may be controlled by controller 32 based on an actuation of accelerator 30, also referred to as "throttle", by the operator. In some embodiments, battery 28 may be a lithium ion or other type of battery. In various embodiments, motor 18 may be a permanent magnet synchronous motor or a brushless direct current motor for example. Motor 18 may be of a same type as, or may include elements of, the motors described in U.S. Provisional Patent Applications No. 63/135,466 (Title: Drive unit for electric vehicle) and No. U.S. 63/135,474 (Title: Drive unit with fluid pathways for electric vehicle), which are incorporated herein by reference.

Vehicle 10 may also include one or more brakes 34 (referred hereinafter in the singular) that may be applied or released by an actuation of a suitable brake actuator (e.g., lever) by the operator for example. Brake 34 may be operable as a main brake for the purpose of slowing and stopping vehicle 10 during motion of vehicle 10. Alternatively or in addition, brake 34 may be operable as a parking brake, sometimes called "e-brake" or "emergency brake", of vehicle 10 intended to be used when vehicle 10 is stationary. In various embodiments, such main and parking brake functions may use separate brakes, or may use a common brake 34. For example, brake 34 may be a friction-type brake including a master cylinder operatively connected to a brake caliper that urges bake pads against a brake rotor or disk that is coupled to the powertrain of vehicle 10. In some embodiments, such brake rotor may be secured to and rotatable with drive shaft 26.

Actuation of the brake actuator (e.g. lever) may cause a combination of tractive braking and regenerative braking. In some embodiments, the braking may be implemented as described in U.S. patent application Ser. No. 17/091,712 entitled "Braking system for an off-road vehicle", the entirety of which is incorporated herein by reference. In some embodiments, regenerative braking may be used such that the battery 28 is supplied with electric energy generated by motor 18 operating as a generator when the brake actuator (e.g. lever) is applied, and/or when the operator releases accelerator 30.

In some embodiments, system 12 may include operator key 36 permitting the operation of vehicle 10 when key 36 is received into receptacle 38 of vehicle 10, or when key 36 is in sufficient proximity to vehicle 10 for example. The engagement of key 36 with receptacle 38 or the proximity of key 36 to vehicle 10 may be communicated to controller 32 so that controller 32 may authorize the operation of vehicle 10. Key 36 may be attached to one end of tether 40 (e.g., lanyard). The opposite end of tether 40 may be attached to the vehicle operator's clothing, belt, or (e.g. for watercraft use) personal flotation device during operation of vehicle 10. The use of tether 40 and key 36 may allow system 12 to automatically stop propulsion of vehicle 10 by, for example, shutting down or reducing the output of motor 18 to prevent vehicle runaway in an emergency situation such as where the operator would become separated from vehicle 10 and consequently key 36 would become removed from receptacle 38 for example. In some embodiments, separation of the key 36 from the receptacle 38 may prevent vehicle runaway in an emergency situation by activating regenerative braking of the motor 18.

Alternatively or in addition to the use of key 36 and tether 40, the presence of the operator in proximity to vehicle 10 and/or the authorization of the operator to operate vehicle 10 may be established by detecting the presence of a portable electronic device (PED) such as a smartphone that may be carried by the operator. Such PED may be in wireless data communication (e.g., paired via Bluetooth®) with controller 32 to inform controller 32 of the proximity of operator via the PED as a proxy. The use of such PED may also provide the ability to detect the operator becoming separated from vehicle 10 in case of a loss of communication between the PED and controller 32 and/or a decrease in signal strength from the PED perceived by controller 32 for example. In other words, the use of the PED in this manner may serve as an electronic tether for automatically stopping propulsion of vehicle 10 to prevent vehicle runaway in an emergency situation. The emergency situation may include any (e.g., sudden, urgent) unexpected occurrence or occasion requiring substantially immediate action such as where the operator would become separated from vehicle 10 while vehicle 10 is in motion for example. The existence of the emergency situation may be automatically determined using controller 32 or may be communicated to controller 32 by the operator.

In some embodiments, system 12 may include (e.g., emergency) shutoff switch 42, sometimes referred to as a "kill switch", operatively connected to controller 32. Shutoff switch 42 may be disposed on or close to handle bar 24 or at another suitable location that is readily accessible by the operator when the operator is in the normal driving position. The actuation of shutoff switch 42 by the operator may also provide the capability of automatically stopping propulsion of vehicle 10 when vehicle 10 is in motion to prevent vehicle runaway when an emergency situation is perceived by the operator.

Figure 2:
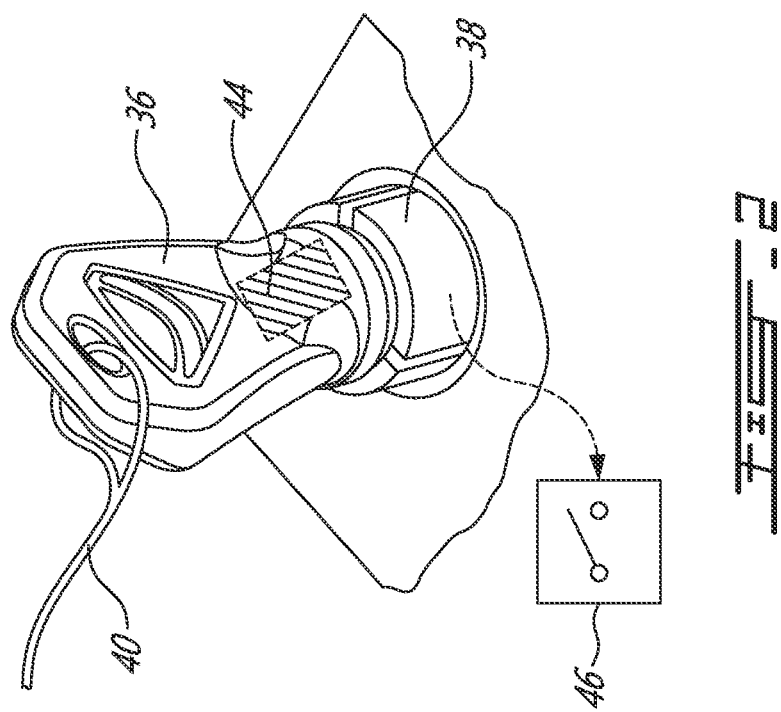
FIG. 2 shows an exemplary key associated with the electric vehicle of FIG. 1.

FIG. 2 shows an exemplary representation of key 36 associated with vehicle 10. During operation of vehicle 10, key 36 may be tethered to the operator via tether 40. In some embodiments, key 36 may be part of a radio-frequency identification (RFID) system of vehicle 10. Key 36 may include RFID tag 44 which may store data identifying key 36 or a specific operator associated with key 36. When triggered by an electromagnetic interrogation pulse from a RFID reader device associated with vehicle 10 and operatively connected to controller 32, RFID tag 44 may wirelessly transmit the data stored on RFID tag 44 and the data may be used by controller 32 to authenticate key 36 and either permit or prevent the operation of vehicle 10 based on the data.

The proximity of RFID tag 44 to vehicle 10 may be used to detect the presence of key 36 by controller 32. The data stored on RFID tag 44 may be used by controller 32 to authenticate key 36. The use of key 36 as part of a RFID system of vehicle 10, and/or the use of a PED in communication with controller 32, may allow controller 32 to implement a software-based tether switch 46, shown schematically in FIG. 2, that may be used to signal the presence or absence of the operator onboard vehicle 10.

In some embodiments, tether switch 46 may be a physical/mechanical hardware-based switch that physically interacts with key 36. For example, tether switch 46 may be disposed within receptacle 38 so that the insertion and withdrawal of key 36 into and out of receptacle 38 may cause key 36 to interface with and actuate tether switch 46 and signal to controller 32 the presence or absence of the operator onboard vehicle 10.

Whether tether switch 46 is software-based or hardware-based, tether switch 46 may be used to determine whether the operator has become separated from vehicle 10. In the event where the operator should become separated from vehicle 10 while vehicle 10 is in motion, the actuation of tether switch 46 may be used to trigger the interruption of the propulsion of vehicle 10 to prevent vehicle runaway.

FIG. 3 shows an exemplary representation of shutoff switch 42 associated with electric vehicle 10. Shutoff switch 42 may be mounted to handlebar 24 in proximity to accelerator 30 and hand grip 47 so that a (e.g., right) hand of the operator used to actuate accelerator 30 may also be used to actuate shutoff switch 42. Shutoff switch 42 may include a physical push button or rotary knob that may actuated between two positions (e.g., ON and OFF) for example. Actuating shutoff switch 42 from the ON (e.g., up) position to the OFF (e.g., down) position when vehicle 10 is in motion may be used to signal to controller 32 that propulsion of vehicle 10 is to be stopped substantially immediately. In some embodiments, stopping of the propulsion of vehicle 10 may be maintained once shutoff switch 42 is actuated to the OFF position. Shutoff switch 42 may be configured to remain in its ON or OFF positions without requiring continuous contact from the operator's hand. Shutoff switch 42 may be red, orange or other color providing relatively high visibility.

Figure 4:
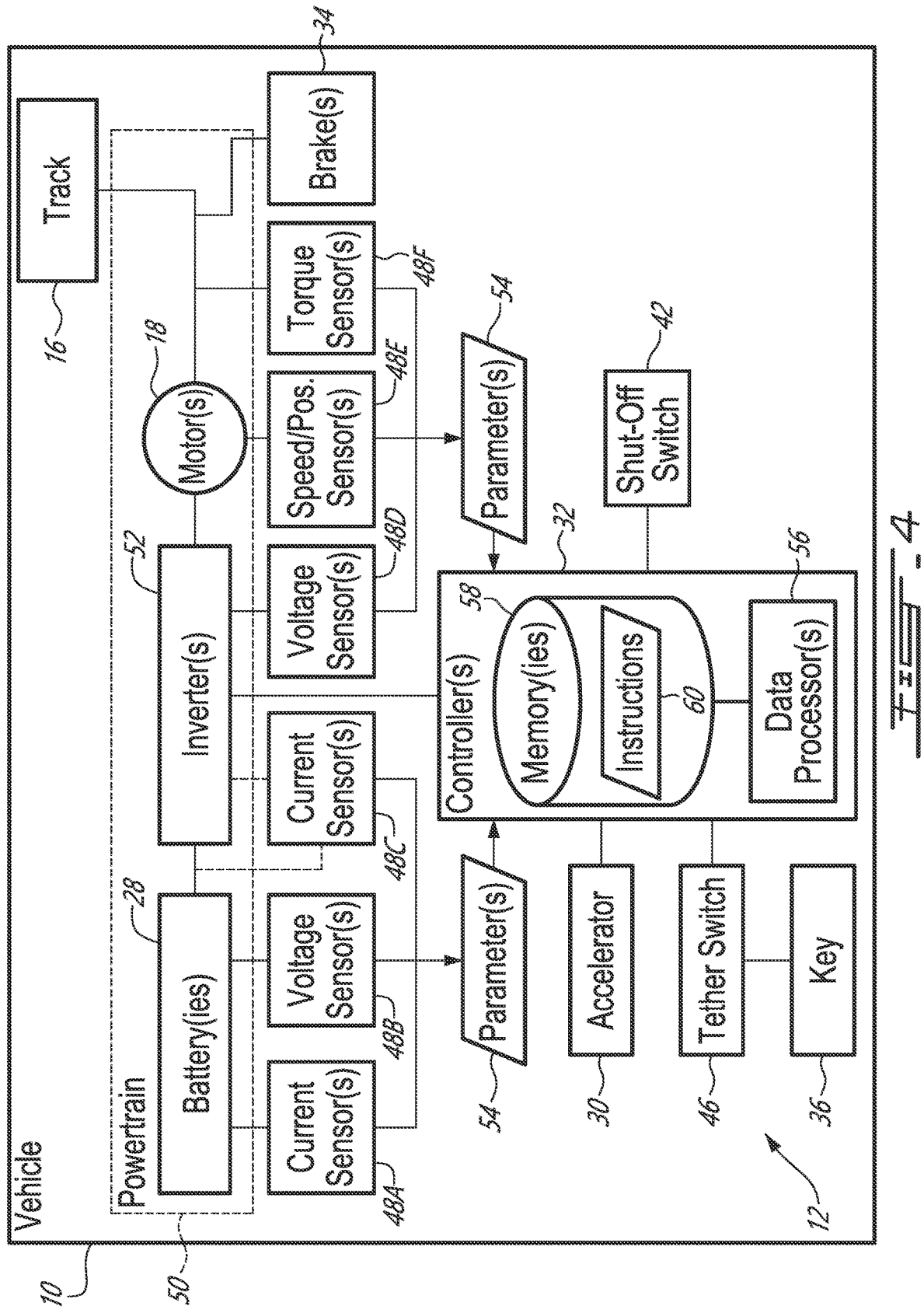
FIG. 4 is a schematic representation of the electric vehicle including the vehicle runaway prevention system.

FIG. 4 is a schematic representation of electric vehicle 10 including runaway prevention system 12. System 12 may include one or more sensors 48A-48F operatively connected to component(s) of powertrain 50 of electric vehicle 10 and also to controller 32. Powertrain 50 may include battery 28, one or more power inverters 52 (referred hereinafter in the singular) and motor 18. Sensor(s) 48A-48F may be configured to sense one or more operating parameters 54 of powertrain 50 for use by controller 32 for regulating the operation of motor 18 and/or controlling other aspects of vehicle 10.

In some embodiments, parameter(s) 54 of powertrain 50 may include data indicative of an amount of electric power being supplied to motor 18. For example, parameter(s) 54 may be acquired via one or more current sensors 48A, 48C and/or one or more voltage sensors 48B, 48D operatively connected to battery 28 and controller 32, or to inverter 52 and controller 32. Current sensor 48C may be operatively disposed between battery 28 and inverter 52 to measure DC current values representative of the real power supplied to motor 18.

In some embodiments, parameter(s) 54 of powertrain 50 may include data indicative of an operating speed and/or angular position of a rotor of motor 18. The operating speed of motor 18 may be acquired via speed/position sensor(s) 48E operatively connected to motor 18 and controller 32. Speed/position sensor(s) 48E may include any suitable instrument such as a rotary encoder and/or tachometer suitable for measuring the angular position of a rotor of motor 18 and/or the rotation speed (e.g., revolutions per minute) of the rotor of motor 18 and/or of drive shaft 26 (shown in FIG. 1).

In some embodiments, parameter(s) 54 of powertrain 50 may include data indicative of an output torque of motor 18. The output torque of motor 18 may be measured directly via torque sensor 48F or may be inferred based on the amount of electric power being supplied to motor 18 for example. In some embodiments, torque sensor 48F may include a rotary (i.e., dynamic) torque transducer suitable for measuring torque on a rotating shaft.

Controller 32 may include one or more data processors 56 (referred hereinafter as "processor 56") and non-transitory machine-readable memory 58. Controller 32 may be configured to regulate the operation of motor 18 via inverter 52, and optionally also control other aspects of operation of vehicle 10. Controller 32 may be operatively connected to sensor(s) 48A-48F via wired or wireless connections for example so that one or more parameter(s) 54 acquired via sensor(s) 48A-48F may be received at controller 32 and used by processor 56 in one or more procedures or steps defined by instructions 60 stored in memory 58 and executable by processor 56.

Controller 32 may carry out additional functions than those described herein. Processor 56 may include any suitable device(s) configured to cause a series of steps to be performed by controller 32 so as to implement a computer-implemented process such that instructions 60, when executed by controller 32 or other programmable apparatus, may cause the functions/acts specified in the methods described herein to be executed. Processor 56 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 58 may include any suitable machine-readable storage medium. Memory 58 may include non-transitory computer readable storage medium such as, for example, but not limited to, an electronic, magnetic, optical, electromagnetic, infrared, or semiconductor system, apparatus, or device, or any suitable combination of the foregoing. Memory 58 may include a suitable combination of any type of machine-readable memory that is located either internally or externally to controller 32. Memory 58 may include any storage means (e.g. devices) suitable for retrievably storing machine-readable instructions 60 executable by processor 56.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memory 58) having computer readable program code (e.g., instructions 60) embodied thereon. Computer program code for carrying out operations for aspects of the present disclosure in accordance with instructions 50 may be written in any combination of one or more programming languages. Such program code may be executed entirely or in part by controller 32 or other data processing device(s). It is understood that, based on the present disclosure, one skilled in the relevant arts could readily write computer program code for implementing the methods described and illustrated herein.

Figure 5:
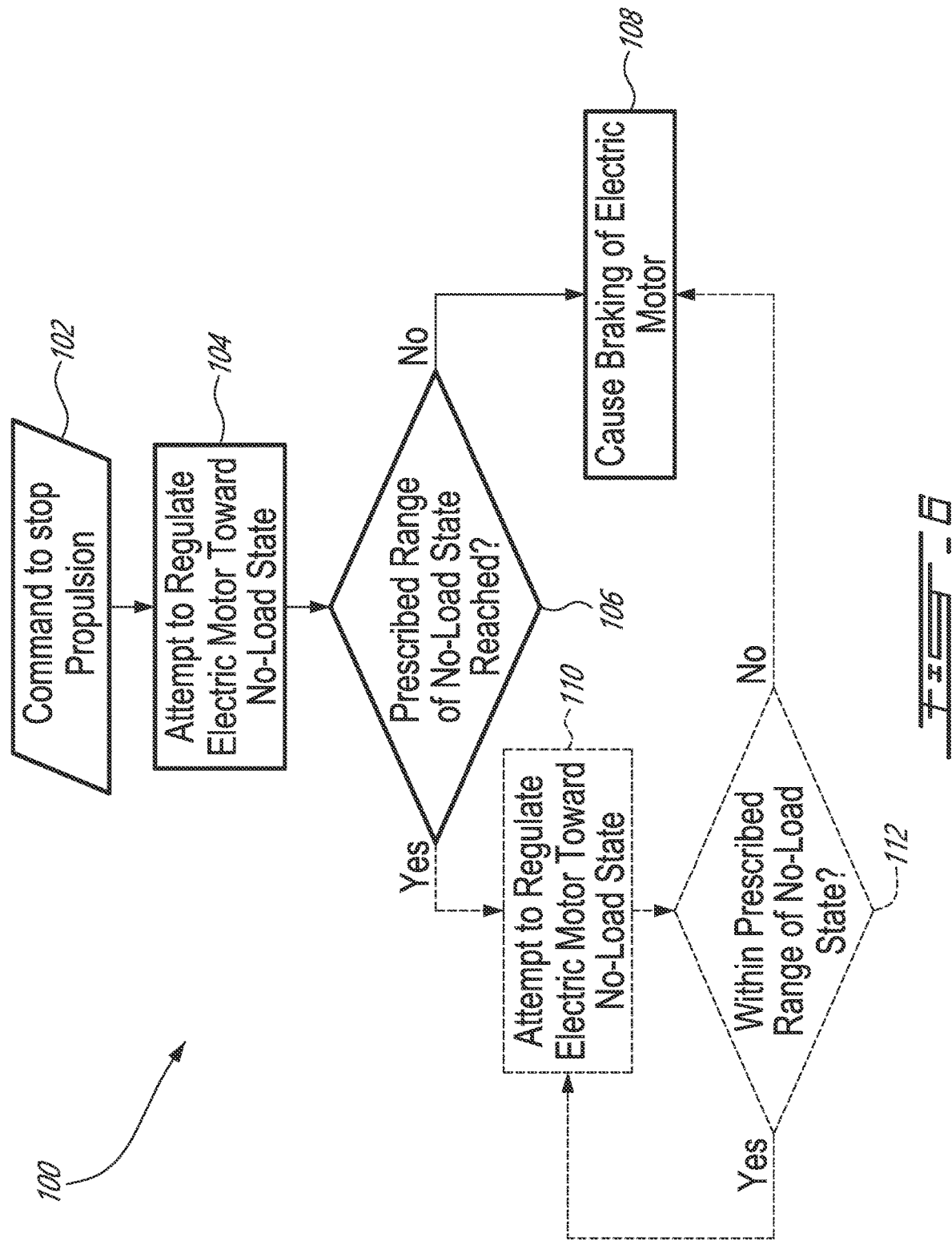
FIG. 5 is a schematic representation of an exemplary power inverter operatively connected between a battery and an electric motor of the electric vehicle.

FIG. 5 is an exemplary schematic representation of power inverter 52 operatively connected between battery 28 and motor 18 of vehicle 10. Controller 32 may generate output(s) 62 for controlling the operation of motor 18 via inverter 52. For example, based on a sensed position of accelerator 30 (shown in FIG. 4) and parameter(s) 54 (e.g., from current sensor 48C and/or other sensors 48A-48F) received as feedback, controller 32 may generate output(s) 62 for controlling the delivery of electric power from battery 28 to motor 18 according to instructions 60. As explained further below, controller 32 may also be configured via instructions 60 to regulate the operation of motor 18 to stop the propulsion of vehicle 10 to prevent vehicle runaway based on a command to stop propulsion of vehicle 10. The command may have the form of a signal indicative of an existence of an emergency condition received via tether switch 46 (shown in FIG. 2), shutoff switch 42 (shown in FIG. 3) and/or other source(s).

The delivery of electric power to motor 18 may be performed by controlling the operation of inverter 52 or other suitable power electronics module operatively disposed between battery 28 and motor 18. Inverter 52 may include suitable electronic switches 64A-64F, such as insulated gate bipolar transistors (IGBTs) for example, to provide motor 18 with electric power having the desired characteristics to implement the desired performance of vehicle 10 based on the input(s) and feedback received at controller 32. Motor 18 may in turn drive one or more ground-engaging members such as track 16 (shown in FIG. 1) of vehicle 10, or one or more wheels of a wheeled vehicle. In case of the vehicle being a PWC, motor 18 may be drivingly coupled to an impeller of the PWC.

Main contactor 63 may be operatively disposed between battery 28 and inverter 52. Main contactor 63 may includes switches 65A, 65B that may be closed or opened to electrically connect battery 28 to inverter 52 when electric power is delivered to motor 18, or to electrically disconnect battery 28 from inverter 52 when propulsion of vehicle 10 is stopped. Main contactor 63 may be controlled by output 62 of controller 32. Switches 65A, 65B are shown in a closed state in FIG. 5. Main contactor 63 may be used (e.g., by the opening of switches 65A, 65B) to prevent electric power from being supplied to armature windings L1, L2 and L3 in some situations. Switches 65A, 65B may be opened or closed when different types of braking of motor 18 are performed.

Motor 18 may be a polyphase (e.g., 3-phase) synchronous motor and may include a plurality of armature (e.g., stator) windings such as armature windings L1, L2, L3 shown schematically in FIG. 5 as an example. Armature windings L1, L2, L3 may be connected in a wye or delta configuration. Neutral point N may be connected to ground G.

FIG. 6 shows a flow diagram of an exemplary method 100 of stopping propulsion of vehicle 10, or another electric (e.g., powersport) vehicle. Machine-readable instructions 60 may be configured to cause controller 32 to perform at least part of method 100. Aspects of method 100 may be combined with other actions or aspects of other methods described herein. Aspects of vehicles described herein may also be incorporated into method 100. In various embodiments, method 100 may include:

when electric power is supplied to motor 18 of vehicle 10 to propel vehicle 10, receiving a command to stop propulsion of vehicle 10 while vehicle 10 is in motion (see block 102);

in response to the command, attempting to regulate an operation of motor 18 toward a no-load operating state of motor 18 while vehicle 10 is in motion (see block 104); and when the operation of motor 18 is outside a prescribed range of the no-load operating state after attempting to regulate the operation of motor 18 toward the no-load operating state, causing braking of motor 18 (see blocks 106 and 108).

When the attempt to regulate the operation of motor 18 toward the no-load operating state of motor 18 is initially successful, method 100 may optionally include monitoring the operation of motor 18 while vehicle 10 is in motion and as controller 32 continues to regulate the operation of motor 18 toward the no-load state (see block 110). At block 112, if the operation of motor 18 goes from inside the prescribed range of the no-load operating state to outside of the prescribed range of the no-load operating state while vehicle 10 is in motion, method 100 may proceed to causing braking of motor 18 at block 108.

The no-load operating state of motor 18 may prevent vehicle runaway in an emergency situation that is automatically detected by controller 32 (e.g., via tether switch 46) or that is intentionally signaled by the operator via shutoff switch 42 for example. The regulation of the operation of motor 18 toward the no-load operating state may be achieved via suitable control of inverter 52 as explained further below. At the no-load operating state, an operating speed (e.g., a rotational speed of the rotor) of motor 18 may substantially match an induced operating speed of the motor 18 induced by the motion of vehicle 10 as vehicle 10 is coasting before eventually stopping. In other words, the induced operating speed of motor 18 may correspond to an operating speed of motor 18 caused by motor 18 being back-driven via track 16 and other drivetrain components of vehicle 10 when vehicle 10 is in motion. As vehicle 10 is coasting as a result of motor 18 being in the no-load operating state, method 100 may also include continuing to attempt to cause the operating speed of motor 18 to substantially match the induced operating speed of motor 18 to maintain the no-load operating state as the speed of vehicle 10 is decreasing. Method 100 may be performed until vehicle 10 has stopped.

Method 100 may define an escalation protocol where, in the event that the no-load operating state would not be substantially reached within a prescribed amount of time, an alternate runaway prevention mechanism would be provided. The regulation of motor 18 toward the no-load state may be considered a primary mechanism for stopping the propulsion of vehicle 10 and preventing vehicle runaway. However, the braking of motor 18 may be provided as a secondary fail-safe mechanism and as a redundancy for stopping the propulsion of vehicle 10 in case of malfunction of the primary mechanism for example. The use of primary and secondary mechanisms in method 100 may provide a relatively reliable and robust vehicle runaway prevention capability for vehicle 10 thereby promoting operator safety when operating vehicle 10.

In various embodiments of method 100, the command to stop propulsion of vehicle 10 may be received via shutoff switch 42, tether switch 46 or other source(s). Further aspects of method 100 are described below in relation to FIGS. 7A-10B.

Figure 7B:
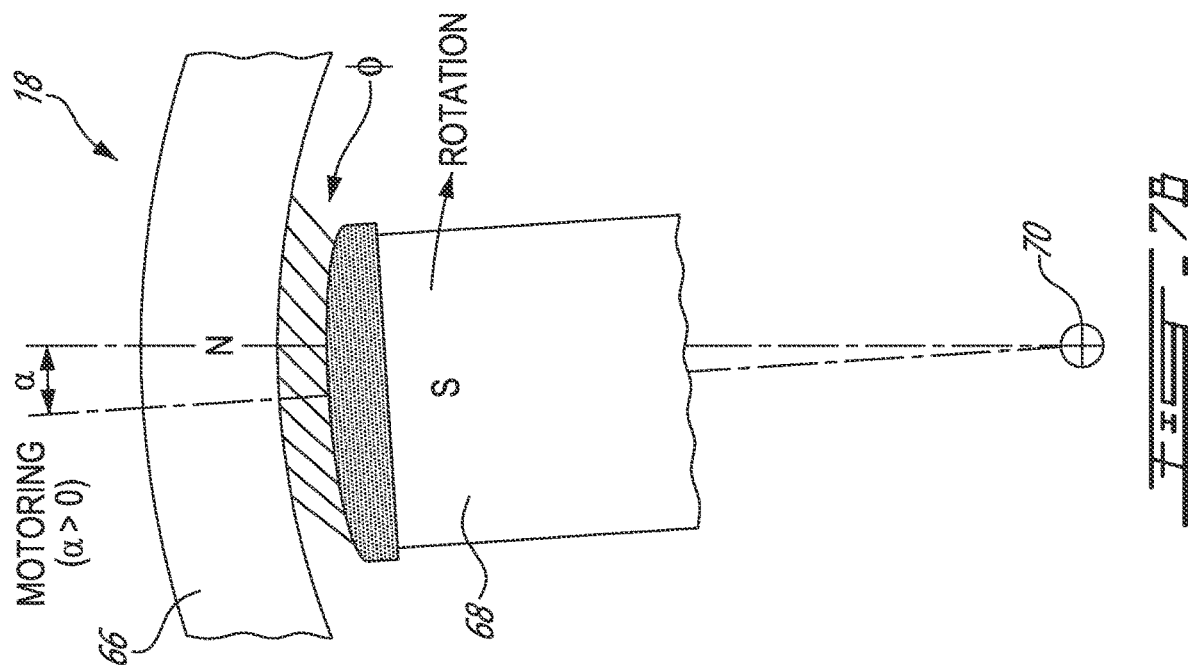
Figure 7A:
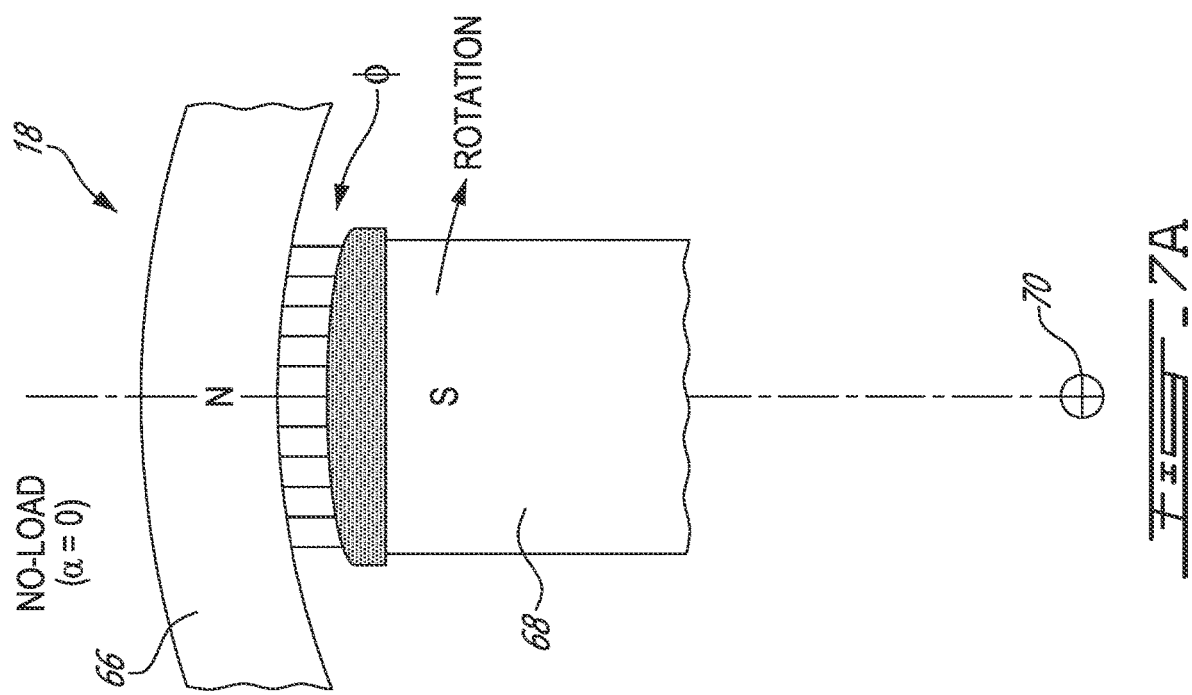

FIGS. 7A-7C are schematic representations of part of motor 18 in the no-load operating state, in a motoring (e.g., loaded) operating state, and in a generating operating state respectively. Motor 18 may include stator 66 and rotor 68 rotatable about axis 70. Stator 66 may be considered the armature of motor 18 and may carry windings L1, L2, L3 shown schematically in FIG. 5. Rotor 68 may be a salient pole rotor that is magnetized by permanent magnets. FIGS. 7A-7C schematically show magnetic flux P between the opposing poles of stator 66 and rotor 68.

The no-load operating state illustrated in FIG. 7A may be achieved by way of controlling inverter 52 so that a substantially no torque operating state is achieved. The no-load operating state may be achieved as a result of a substantially "zero-torque" command being executed by controller 32. In other words, the no-load operating state may correspond to substantially no torque being output from motor 18 or being input into motor 18 operating as a generator. As motor 18 is operated at no load, the total input power to motor 18 may be relatively low and substantially equal to (e.g., iron, friction and windage) losses of motor 18.

In the no-load operating state of motor 18 where rotor 68 is back driven, switches 64A-64F of inverter 52 may be controlled so that the angular positions of poles generated on stator 66 substantially correspond to the angular positions of opposite poles of rotor 68. Such control of inverter 52 may be achieved by controller 32 based on position feedback of rotor 68 from speed/position sensor 48E shown in FIG. 4, input current feedback via current sensor 48C shown in FIGS. 4 and 5, torque feedback via torque sensor 48F shown in FIG. 4, and/or other sensor(s). In the no-load operating state, mechanical angle α may be substantially zero. In other words, the rotor poles may be directly opposite the stator poles and their axes may substantially coincide as rotor 68 rotates.

During a motoring operation of motor 18 under a mechanical load as illustrated in FIG. 7B, the rotor poles may fall behind the stator poles but rotor 68 may continue to rotate at the commanded synchronous speed. The rotation of rotor 68 may be driven by the attraction of opposite poles on stator 66 and rotor 68. As the load is increased, the mechanical angle α between axes of rotor poles and axes of stator poles may progressively increase as well so that α>0. As the load is increased, motor 18 may develop more torque and consequently draw more electric current.

During the generating (e.g., regenerative braking) operation of motor 18 as illustrated in FIG. 7C, the rotor poles may be ahead the stator poles and rotor 68 may continue to rotate at the synchronous speed. Switches 64A-64F of inverter 52 may be controlled to achieve a desired negative mechanical angle α<0 to achieve a desired generating and/or braking behaviour. Such control of inverter 52 may be achieved by controller 32 based on position feedback of rotor 68 from speed/position sensor 48E shown in FIG. 4, output current feedback via current sensor 48C shown in FIGS. 4 and 5, torque feedback via torque sensor 48F shown in FIG. 4, and/or other sensor(s). As the absolute value of the mechanical angle α between axes of rotor poles and axes of stator poles is caused to increase, motor 18 may, in some situations, generate more current and may provide more aggressive braking of vehicle 10.

Figure 8:
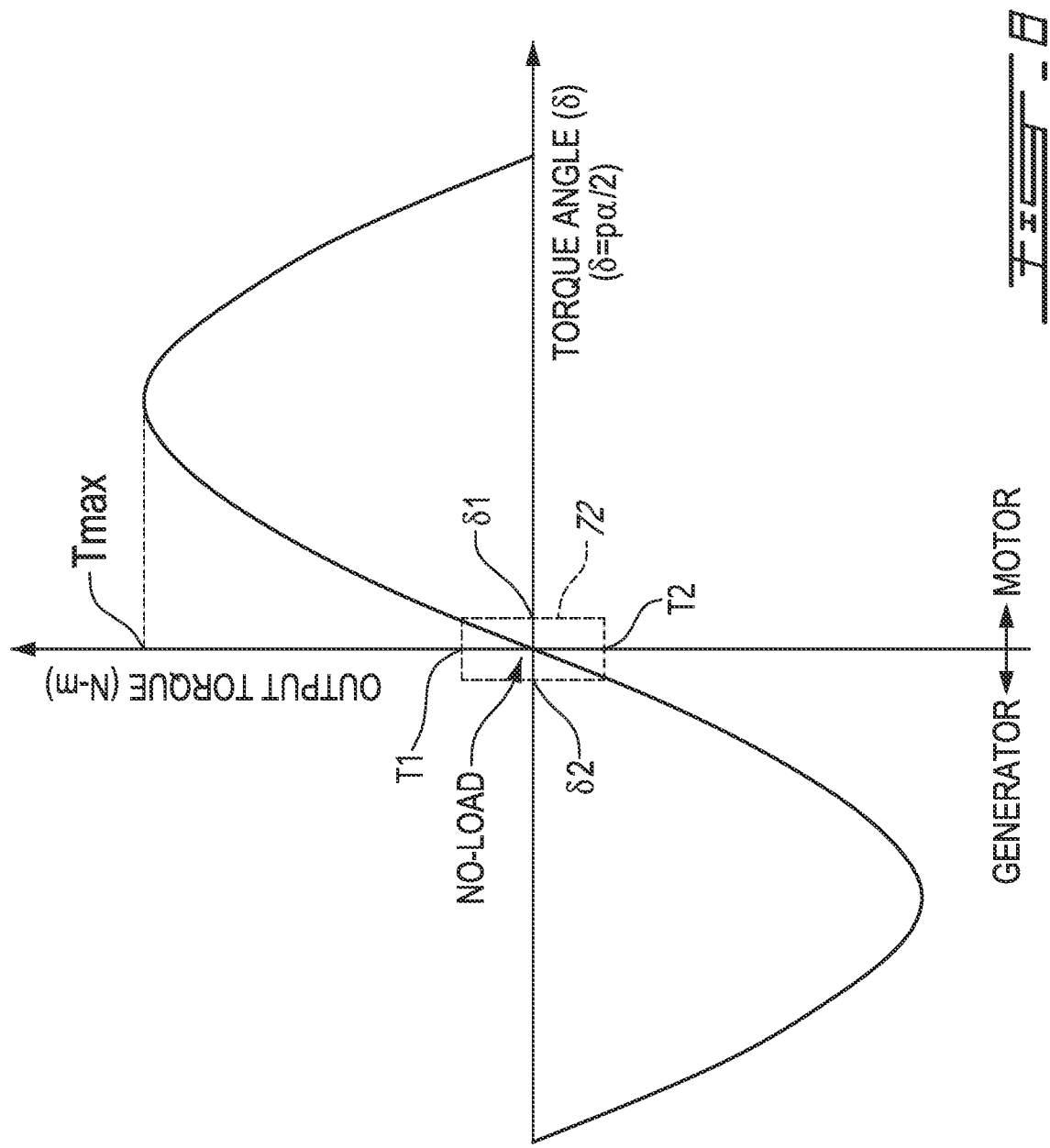
FIG. 8 shows an exemplary representation of a graph of an output torque of the electric motor versus an electrical torque angle.

FIG. 8 shows an exemplary representation of a graph of electrical torque angle δ versus torque output of motor 18. The no-load operating condition of motor 18 illustrated in FIG. 7A may occur at the intersection of the ordinate and abscissa of the graph. Torque angle δ may be related to mechanical angle α illustrated in FIGS. 7A and 7B by the relation δ=pα/2 where p corresponds to the number of poles in motor 18. The right side of the graph may correspond to the motoring operation of motor 18 depicted in FIG. 7B where mechanical angle α is positive. The left side of the graph may correspond to the generating operation of motor 18 depicted in FIG. 7C where mechanical angle α is negative and the rotor poles are ahead of the stator poles.

During the performance of method 100, the braking of motor 18 may be initiated when the operation of motor 18 is outside prescribed range 72 of the no-load operating state after the prescribed amount of time. In other words, the braking of motor 18 may be initiated when the attempt to regulate motor 18 toward the no-load operating state has been determined to be unsuccessful or unsatisfactory. Prescribed range 72 is illustrated in FIG. 8 as a box representing a window of torque values extending between first torque value T1 corresponding to first torque angle δ1, and second torque value T2 corresponding to second torque angle δ2. In some embodiments, first torque value T1 may be positive and correspond to a torque output from motor 18 in a motoring mode of operation. In some embodiments, second torque value T2 may be negative and correspond to a torque input into motor 18 in a generating mode of operation.

Torque values T1 and T2 may be stored in memory 58 of controller 32 and used by controller 32 to regulate the operation of motor 58 toward the no-load operating state. One or both torque values T1 and T2 may be used by controller 32 as one or two thresholds for determining whether the no-load operating state of motor 18 is substantially reached and/or maintained. For example, the operation of motor 18 may be determined to be outside prescribed range 72 of the no-load operating state when the output torque of motor 18 is equal to or greater than first torque value T1. Similarly, the operation of motor 18 may be determined to be outside prescribed range 72 of the no-load operating state when the absolute value of the input torque of motor 18 is equal to or greater than the absolute value of second torque value T2.

In some embodiments, prescribed range 72 may be defined to correspond to ±5% of maximum output torque rating Tmax of motor 18. In some embodiments, prescribed range 72 may be smaller than ±5% of maximum output torque rating Tmax of motor 18. In some embodiments, prescribed range 72 may be defined to correspond to ±2% of maximum output torque rating Tmax of motor 18. In some embodiments, prescribed range 72 may be smaller than ±2% of maximum output torque rating Tmax of motor 18. In some embodiments, prescribed range 72 may be defined to correspond to ±1% of maximum output torque rating Tmax of motor 18. In some embodiments, prescribed range 72 may be smaller than ±1% of maximum output torque rating Tmax of motor 18. Prescribed range 72 may be symmetric or asymmetric across the abscissa of the graph of FIG. 8.

In some embodiments of method 100, the prescribed amount of time provided to allow motor 18 to reach prescribe range 72 of the no-load operating state may be less than one second (e.g., between zero and one second) but it is understood that other prescribed amounts of time may be suitable. The prescribed amount of time may be stored in memory 58 for use by controller 32. In some embodiments, the prescribed amount of time may be a single fixed value or may be variable based on the initial operating state of motor 18 immediately before propulsion is stopped. In some embodiments, the prescribed amount of time may be measured from when the regulation of motor 18 toward the no-load state is initiated. In some embodiments, the prescribed amount of time may represent a duration within which regulation of motor 18 toward the no-load state is being attempted. In some embodiments, the prescribed amount of time may be measured from when the command for stopping the propulsion of vehicle 10 is received at controller 32.

In some embodiments, method 100 may make use of one or more persistence criteria in determining when to cause braking of motor 18. For example, a brief excursion of motor 18 outside of prescribed range 72 before returning within prescribed range 72 may be acceptable and may not necessarily trigger the braking of motor 18 in some embodiments.

FIG. 9 shows a table illustrating a relation between magnitudes of input electric current C1-C3 supplied to motor 18 of vehicle 10, and corresponding output torques T1-T3 of motor 18 associated with the respective magnitudes of input electric current C1-C3. In various embodiments of method 100, the output torque of motor 18 may be measured directly via torque sensor 48F (shown in FIG. 4), or may be inferred based on input electric current C1-C3 to motor 18. For example, the table of FIG. 9 may be a look-up table stored in memory 58 (shown in FIG. 3) and defining a relation between output torque and input current.

The input electric current C1-C3 may correspond to DC current values representative of the real power supplied to motor 18 and that may be measured via current sensor 48C of FIG. 5 for example. The relation of FIG. 9 may be used to infer the output torque based on the input current and used to assess whether or not the no-load operating state of motor 18 has been substantially reached and/or is being maintained based on a torque threshold. Alternatively or in addition, input current values C1-C3 may be used directly by method 100 to assess whether or not the no-load operating state of motor 18 has been substantially reached and/or is being maintained based on a current threshold.

It is understood that a similar table may be used to define a relation between input torque and output current for use by controller 32 during regenerative braking of motor 18 for example. For example, output current values may be used to control the regenerative braking behaviour of motor 18 and/or to assess whether or not the desired regenerative braking behaviour of motor 18 is being achieved.

Figure 10A:
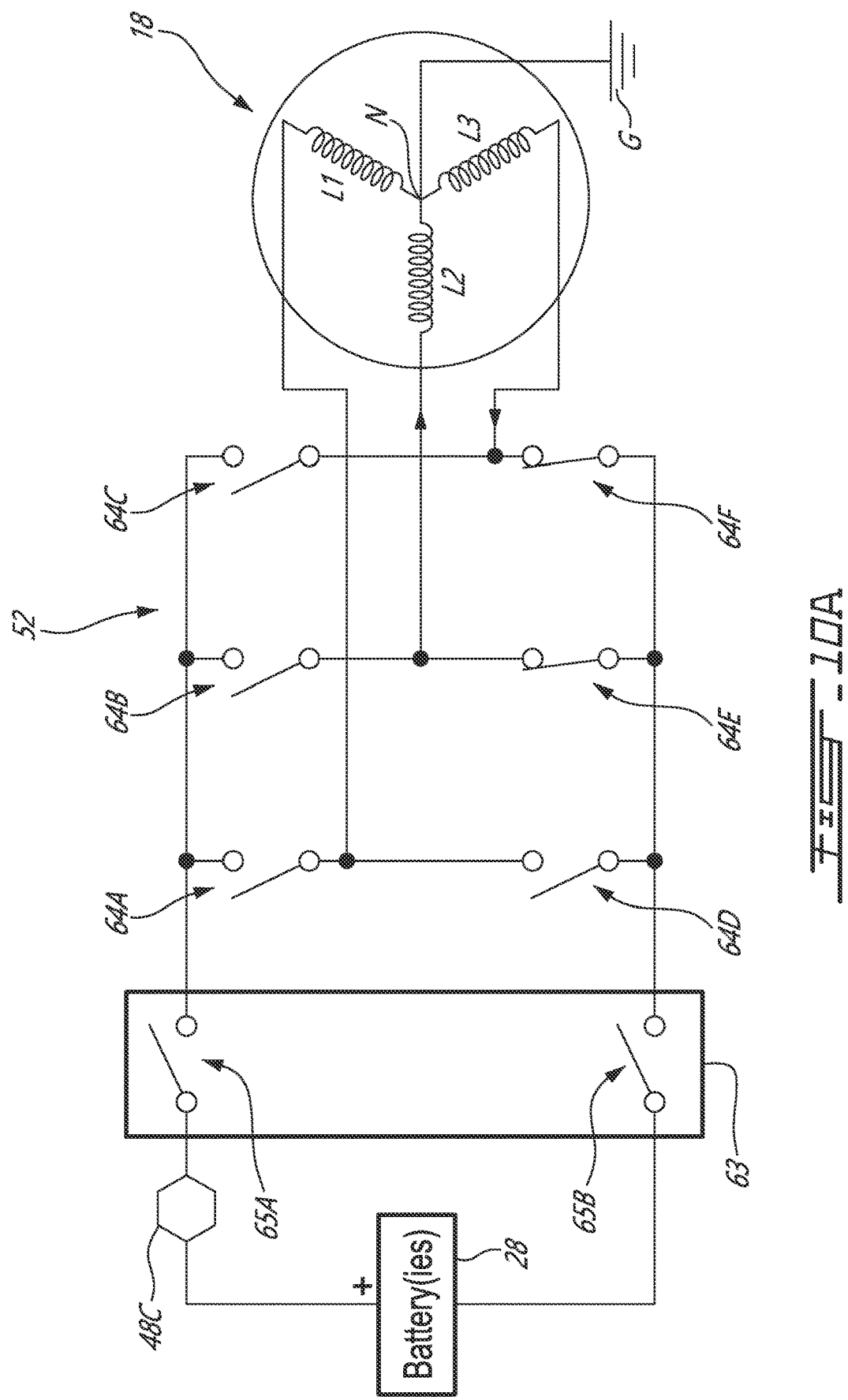
FIG. 10A is a schematic representation of the power inverter of FIG. 5 in a first configuration causing braking of the electric motor.

FIG. 10A is an exemplary schematic representation of inverter 52 in a first configuration causing braking of motor 18. Braking of motor 18 may be achieved via a suitable configuration of switches 64A-64F of inverter 52. In some embodiments, braking of motor 18 may exclude the use of mechanical (e.g., friction) braking using brake 34 of FIG. 1 for example. In some embodiments, braking of motor 18 may include electrical (e.g., dynamic) braking wherein motor 18 is used as a generator. For example, braking of motor 18 may include rheostatic braking where the generated electrical power is dissipated as heat in resistors external to motor 18. During rheostatic braking, switches 65A, 65B of main contactor 63 may be in the open state. For example, braking of motor 18 may include regenerative braking where the generated electrical power is returned to the supply line for charging battery 28. During regenerative braking, switches 65A, 65B of main contactor 63 may be in the closed state.

In the exemplary configuration of inverter 52 shown in FIG. 10A, a form of eddy braking is used where the supply of electric power to armature windings L1, L2, L3 of motor 18 is prevented, and two armature windings L2 and L3 are placed in a short-circuit state. When armature windings L2 and L3 of motor 18 are short-circuited, motor 18 may no longer receive electric energy from battery 28, but the energized field of motor 18 may remain energized and the inertia of rotor 68 and of the connected load may keep rotor 68 rotating for a period of time. The short-circuit state of armature windings L2 and L3 may cause slowing of rotor 68 as motor 18 functions as a generator and energy is dissipated in resistive elements of their respective circuits internal to motor 18.

In the configuration shown in FIG. 10A, switches 64A-64D may be commanded (e.g., by controller 32) to be in an open state and switches 64E and 64F may be commanded (e.g., by controller 32) to be in a closed state. In the configuration of inverter 52 shown in FIG. 10A, switches 65A, 65B of main contactor 63 may be in the open state or closed state.

FIG. 10B is a schematic representation of the power inverter of FIG. 5 in a second state causing braking of the electric motor. In the exemplary configuration of inverter 52 shown in FIG. 10B, a similar form of eddy braking is used where the supply of electric power to armature windings L1, L2, L3 of motor 18 is prevented, and all armature windings L1, L2 and L3 are placed in the short-circuit state. The short-circuit state of all armature windings L1, L2 and L3 may cause slowing of rotor 68 as motor 18 functions as a generator and energy is dissipated in resistive elements of their respective circuits internal to motor 18.

Figure 11:
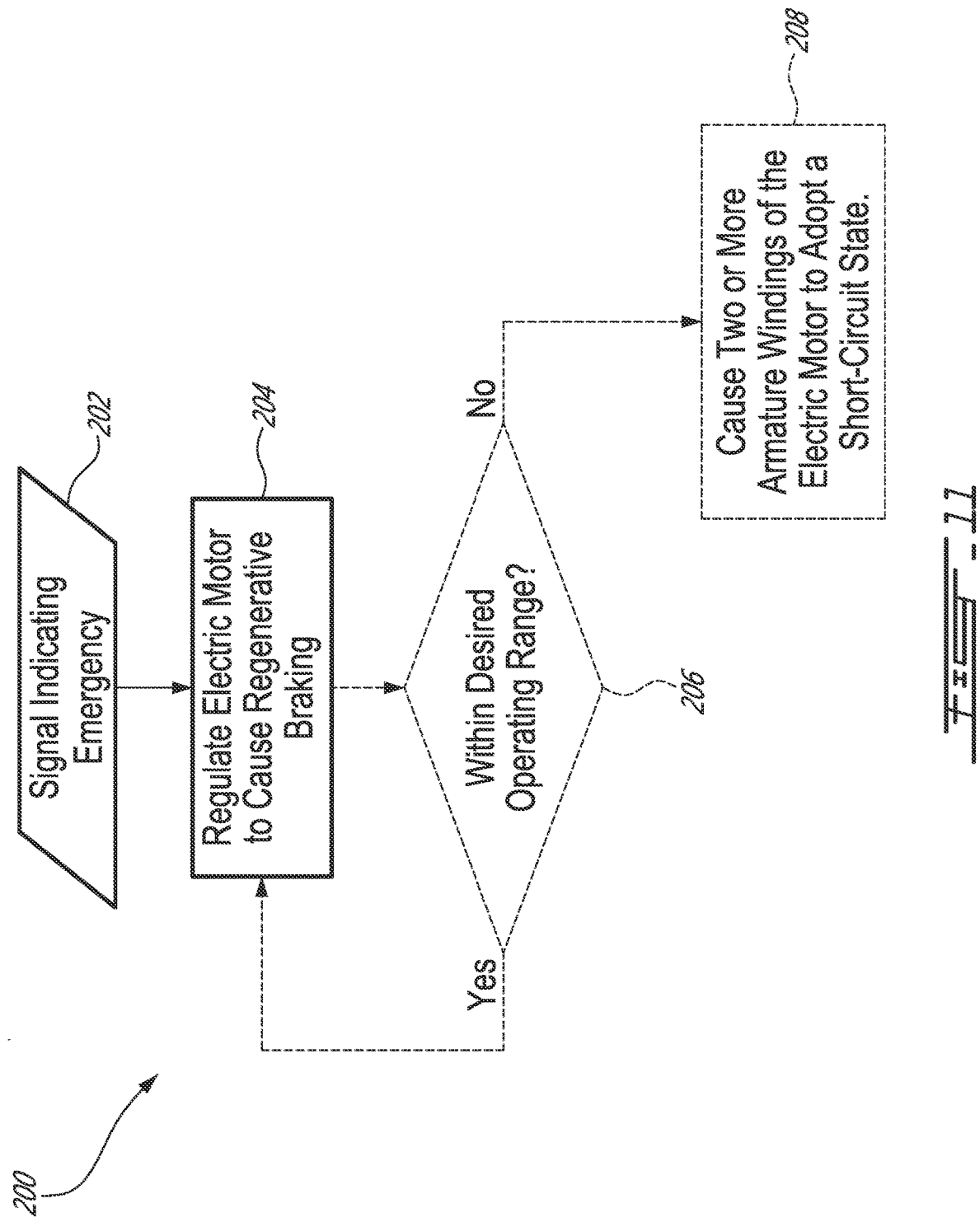
FIG. 11 shows a flow diagram of an exemplary method of preventing vehicle runaway of an electric powersport vehicle.

In the configuration shown in FIG. 10B, switches 64A-64C may be commanded to be in the open state and switches 64D-64F may be commanded to be in the closed state. In the configuration of inverter 52 shown in FIG. 10B, switches 65A, 65B of main contactor 63 may be in the open state or closed state FIG. 11 shows a flow diagram of an exemplary method 200 of preventing vehicle runaway of vehicle 10 or another electric (e.g., powersport) vehicle. Machine-readable instructions 60 may be configured to cause controller 32 to perform at least part of method 200. Aspects of method 200 may be combined with other actions or aspects of other methods described herein. Aspects of vehicles described herein may also be incorporated into method 200. In various embodiments, method 200 may include:

receiving a signal indicating an existence of an emergency situation while vehicle 10 is in motion (see block 202); and in response to the signal, attempting to regulate an operation of motor 18 to cause regenerative braking of motor 18 while vehicle 10 is in motion (see block 204).

In various embodiments of method 200, the signal may be received via emergency shutoff switch 42 and/or via tether switch 46 and may be indicative of the operator being separated from vehicle 10 when vehicle 10 is in motion for example. The regenerative braking may be initiated automatically and substantially immediately upon receipt of the signal, and without the need for the activation of brake 34.

Method 200 may make use of regenerative braking as a primary mechanism for preventing vehicle runaway. In some embodiments, method 200 may optionally make use of a backup mechanism for preventing vehicle runaway. The backup mechanism may be used in the event where the operation of motor 18 is outside of a predefined operating range due to a malfunction of the primary mechanism as determined by controller 32 for example (see block 206). The predefined operating range may include one or more current thresholds of output current from motor 18 while motor 18 is operating as a generator. The predefined operating range may include one or more torque thresholds of input torque to motor 18 while motor 18 is operating as a generator. The predefined operating range may include torque and/or current values that are indicative of a desired braking behaviour of motor 18 and safe slowing of vehicle 10 to prevent vehicle runaway. Method 200 may be performed until vehicle 10 has substantially stopped.

In some embodiments, the backup mechanism for preventing vehicle runaway may include braking of motor 18 by, for example, causing two or more armature windings L1, L2, L3 of motor 18 to adopt a short-circuit state as illustrated in FIG. 10A or 10B for example (see block 208). During the short-circuit state, motor 18 may be electrically disconnected from battery 28. The backup mechanism may be activated when the attempt to regulate the operation of motor 18 to cause regenerative braking of motor 18 has been unsuccessful or has produced unsatisfactory results after a prescribed amount of time (e.g., less than one second).

Figure 12:
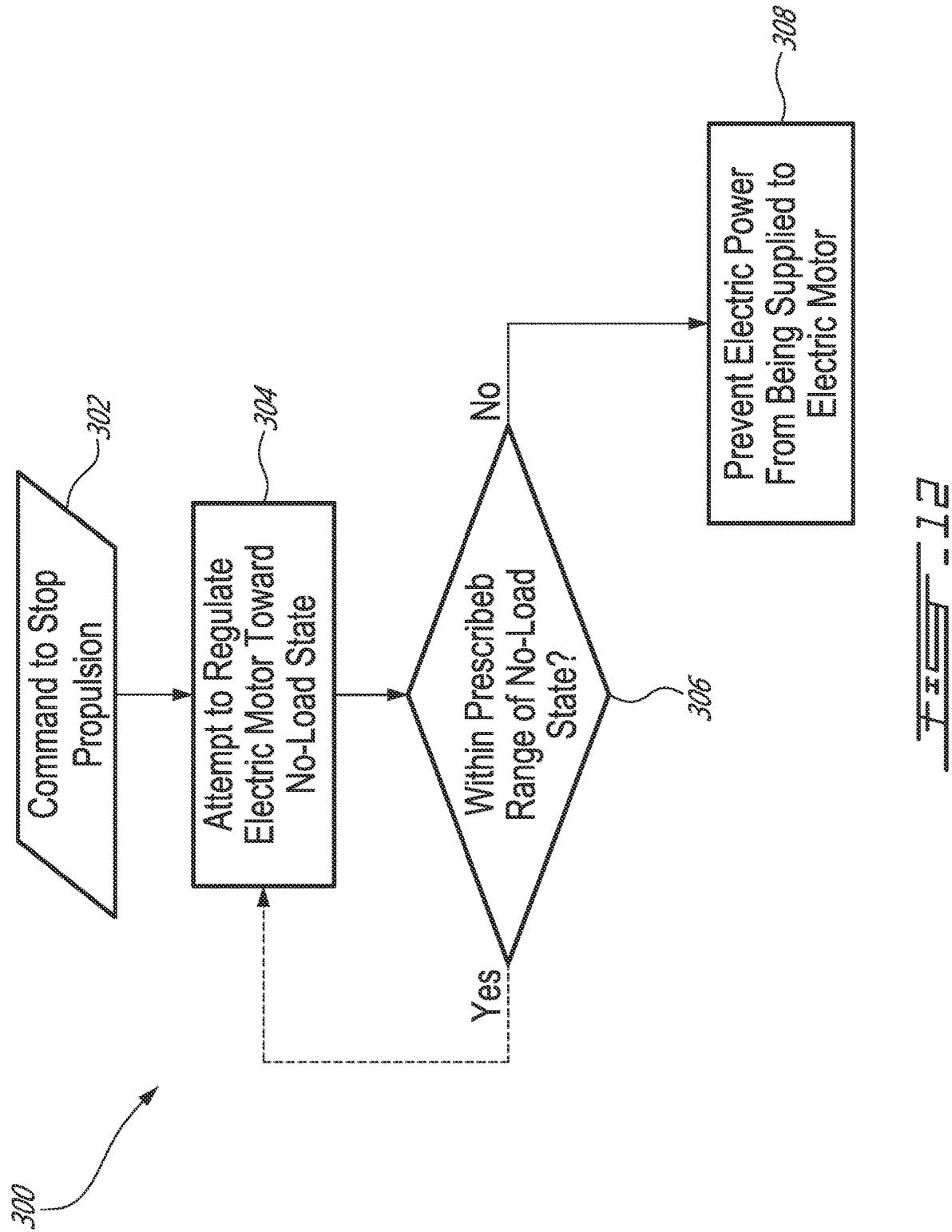
FIG. 12 shows a flow diagram of an exemplary method of stopping propulsion of an electric powersport vehicle in motion.

FIG. 12 shows a flow diagram of an exemplary method 300 of stopping propulsion of vehicle 10 or another electric (e.g., powersport) vehicle in motion. Machine-readable instructions 60 may be configured to cause controller 32 to perform at least part of method 300. Aspects of method 300 may be combined with other actions or aspects of other methods described herein. Aspects of vehicles described herein may also be incorporated into method 300. In various embodiments, method 300 may include:

while vehicle 10 is in motion, receiving a command to stop propulsion of vehicle 10 (see block 302);

in response to the command, initiating a regulation of an operation of motor 18 configured to propel vehicle 10 toward a no-load operating state of motor 18 while vehicle 10 is in motion (see block 304); and when the operation of motor 18 is outside prescribed range 72 of the no-load operating state after a prescribed amount of time after initiating the regulation of the operation of motor 18 toward the no-load operating state (see block 306), preventing electric power from being supplied to armature windings L1, L2, L3 of motor 18 while vehicle 10 is in motion (see block 306).

Aspects of method 300 are described below in relation to FIG. 13.

Figure 13:
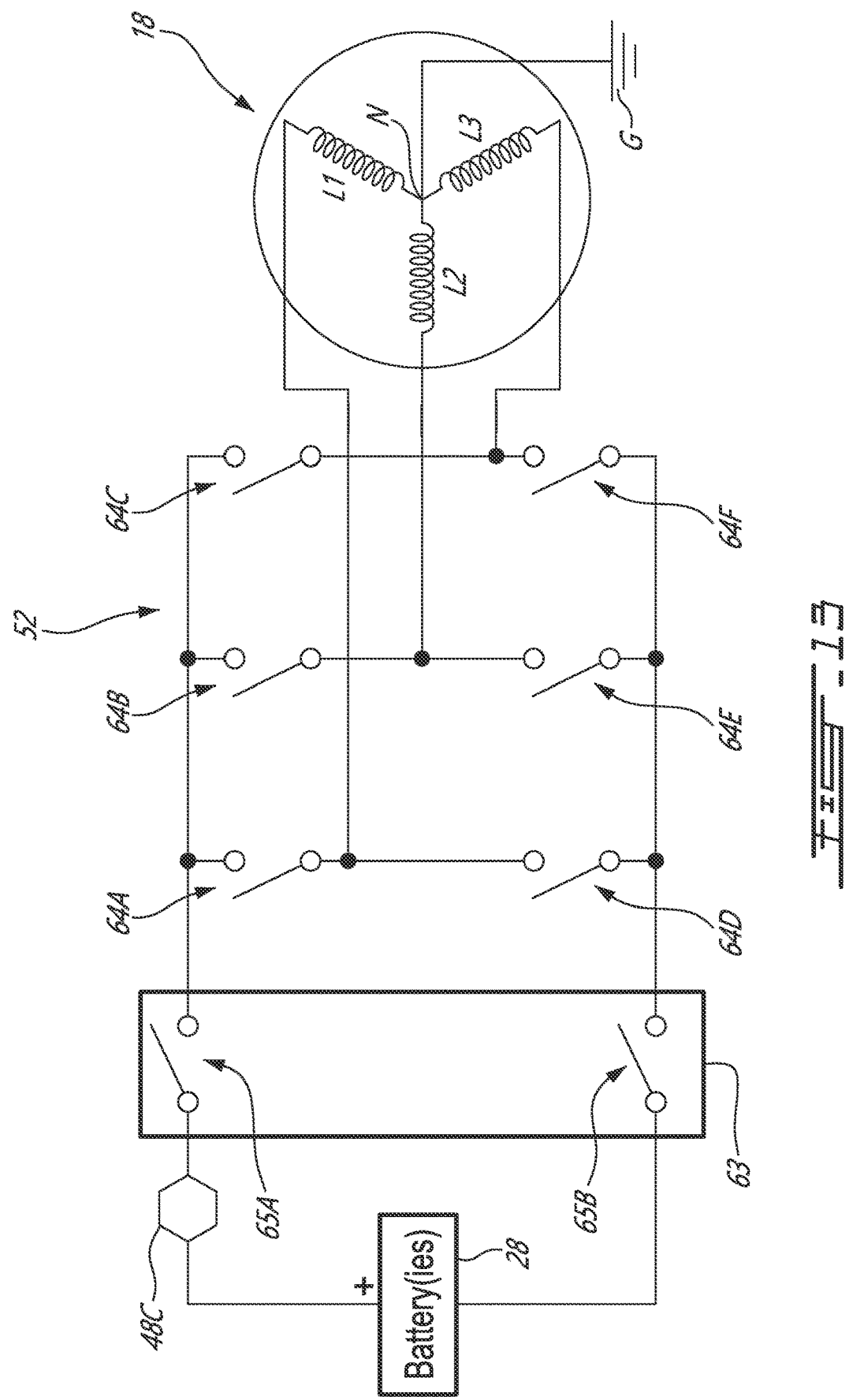
FIG. 13 is a schematic representation of the power inverter and main contactor of FIG. 5 in a configuration where electric power is prevented from being supplied to armature windings of the electric motor.

FIG. 13 is a schematic representation of inverter 52 and main contactor 63 of FIG. 5 in a configuration where electric power is prevented from being supplied to armature windings L1, L2, L3 of motor 18. Preventing electric power from being supplied to armature windings L1, L2, L3 of motor 18 may include electrically disconnecting battery 28 from inverter 52 by opening switches 65A, 65B of main contactor 63. Alternatively or in addition, preventing electric power from being supplied to armature windings L1, L2, L3 of motor 18 may include opening switches 64A-64C and/or switches 64D-64F of inverter 52.

In some embodiments of method 300, main contactor 63 may be caused to adopt the configuration of FIG. 13 and inverter 52 may be caused to adopt the configurations of FIG. 10A or 10B so that two or more of armature windings L1, L2, L3 may adopt a short-circuit state.

In some embodiments of method 300, main contactor 63 may be caused to adopt the configuration of FIG. 13 with switches 65A, 65B open, and inverter 52 may be caused to adopt the configuration of FIG. 13 with switches 64A-64F open so that armature windings L1, L2, L3 may adopt an open-circuit state.

Determining that the operation of motor 18 is outside the prescribed range of the no-load operating state may occur when an output torque of motor 18 is equal to or greater than a torque threshold, and/or when an input current to motor 18 is equal to or greater than a current threshold. The prescribed amount of time may be less than one second.

In some embodiments of method 300, the command may be received from an emergency shutoff switch 42 or from tether switch 36 of vehicle 10.

During vehicle runaway prevention whether via method 100, method 200, method 300 or other action(s) described herein, propulsion commands received via accelerator 30 may be disregarded by controller 32. In various embodiments, the normal operation of vehicle 10 may be resumed be moving emergency shutoff switch 42 to the ON position and/or recoupling key 36 with receptacle 38 or otherwise configuring tether switch 46 to indicate that the operator is onboard vehicle 10.

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

What is claimed is:

1. A method of stopping propulsion of an electric powersport vehicle in an emergency situation, the method comprising:

causing an electric motor of the electric powersport vehicle to propel the electric powersport vehicle;

receiving, via an emergency shutoff switch of the electric powersport vehicle or via a tether switch of the electric powersport vehicle, a command to stop propulsion of the electric powersport vehicle while the electric powersport vehicle is in motion;

in response to the command, attempting to regulate an operation of the electric motor toward a no-load operating state of the electric motor while the electric powersport vehicle is in motion and as a speed of the electric powersport vehicle is decreasing, wherein in the no-load operating state, the electric motor is controlled so that substantially no torque is output from the electric motor or is input into the electric motor operating as a generator; and when the operation of the electric motor is outside a prescribed range of the no-load operating state after attempting to regulate the operation of the electric motor toward the no-load operating state, causing braking of the electric motor via a power inverter while the electric powersport vehicle is in motion.

2. The method as defined in claim 1, wherein causing braking of the electric motor via the power inverter includes:

preventing electric power from being supplied to armature windings of the electric motor; and causing two or more of the armature windings to adopt a short-circuit state.

3. The method as defined in claim 2, wherein causing two or more of the armature windings to adopt the short-circuit state includes causing all armature windings of the electric motor to adopt the short-circuit state.

4. The method as defined in claim 1, comprising determining that the operation of the electric motor is outside the prescribed range of the no-load operating state when an output torque of the electric motor is equal to or greater than a torque threshold.

5. The method as defined in claim 1, comprising determining that the operation of the electric motor is outside the prescribed range of the no-load operating state when an input current to the electric motor is equal to or greater than a current threshold.

6. The method as defined in claim 1, comprising:

when the operation of the electric motor is inside the prescribed range of the no-load operating state, monitoring the operation of the electric motor while the electric powersport vehicle is in motion; and when the operation of the electric motor goes from inside the prescribed range of the no-load operating state to outside the prescribed range of the no-load operating state while the electric powersport vehicle is in motion, causing braking of the electric motor.

7. The method as defined in claim 1, wherein causing braking of the electric motor is performed after a prescribed amount of time of attempting to regulate the operation of the electric motor toward the no-load operating state.

8. A computer program product for stopping propulsion of an electric powersport vehicle, the computer program product comprising a non-transitory computer readable storage medium having program code embodied therewith, the program code readable/executable by a computer, processor or logic circuit to perform the method as defined in claim 1.

9. The method as defined in claim 1, wherein in the no-load operating state, an operating speed of the electric motor is controlled to substantially match an induced operating speed of the electric motor induced by the motion of the electric powersport vehicle as the electric powersport vehicle is coasting.

10. The method as defined in claim 9, comprising continuing to cause the operating speed of the electric motor to substantially match the induced operating speed of the electric motor as the electric powersport vehicle is coasting.

11. The method as defined in claim 1, wherein in the no-load operating state, angular positions of axes of rotor poles of the electric motor substantially correspond to angular positions of axes of stator poles of the electric motor.

12. The method as defined in claim 1, wherein in the no-load operating state, the power inverter regulates the electric motor based on position feedback of a rotor of the electric motor so that a mechanical angle of the electric motor is substantially zero.

13. An electric powersport vehicle with vehicle runaway prevention, the electric powersport vehicle comprising:
  an electric motor for propelling the electric powersport vehicle;
  one or more sensors operatively connected to sense one or more parameters indicative of an operation of the electric motor;
  a switch to initiate a command during an emergency situation while the electric powersport vehicle is in motion;
  a controller operatively connected to the electric motor, to the switch and to the one or more sensors, the controller being configured to:
    in response to the command, attempt to regulate, while the electric powersport vehicle is in motion and as a speed of the electric powersport vehicle is decreasing, the operation of the electric motor toward a no-load operating state of the electric motor, wherein in the no-load operating state, the electric motor is controlled so that substantially no torque is output from the electric motor or is input into the electric motor operating as a generator; and
    when the operation of the electric motor is outside a prescribed range of the no-load operating state after attempting to regulate the operation of the electric motor toward the no-load operating state, cause braking of the electric motor via a power inverter while the electric powersport vehicle is in motion.

14. The electric powersport vehicle as defined in claim 13, wherein causing braking of the electric motor via the power inverter includes:
  preventing electric power from being supplied to armature windings of the electric motor; and
  causing two or more of the armature windings of the electric motor to adopt a short-circuit state.

15. The electric powersport vehicle as defined in claim 13, wherein the controller is configured to determine that the operation of the electric motor is outside the prescribed range of the no-load operating state when an output torque of the electric motor is equal to or greater than a torque threshold.

16. The electric powersport vehicle as defined in claim 13, wherein the controller is configured to determine that the operation of the electric motor is outside the prescribed range of the no-load operating state when an input current to the electric motor is equal to or greater than a current threshold.

17. The electric powersport vehicle as defined in claim 13, wherein the controller is configured to cause braking of the electric motor via the power inverter after a prescribed amount of time of attempting to regulate the operation of the electric motor toward the no-load operating state.

18. The electric powersport vehicle as defined in claim 17, wherein the prescribed amount of time is less than one second.

19. The electric powersport vehicle as defined in claim 13, wherein the controller is configured to:
  when the operation of the electric motor is inside the prescribed range of the no-load operating state, monitoring the operation of the electric motor while the electric powersport vehicle is in motion; and
  when the operation of the electric motor goes from inside the prescribed range of the no-load operating state to outside of the prescribed range of the no-load operating state while the electric powersport vehicle is in motion:
    prevent electric power from being supplied to the electric motor; and
    cause braking of the electric motor via the power inverter.

20. The electric powersport vehicle as defined in claim 13, wherein the electric powersport vehicle is a snowmobile.

* * * * *